US012634877B2

(12) United States Patent (10) Patent No.: US 12,634,877 B2
Prasad et al. (45) Date of Patent: May 19, 2026

(54) CONVERTING WIRELESS COMMUNICATIONS SYSTEM-BASED POSITIONING TO POSITIONAL DESCRIPTIONS WITH RESPECT TO DESCRIPTIONAL LAYOUTS OF ASSETS

(71) Applicant: QUALCOMM Incorporated, San Diego, CA (US)

(72) Inventors: Abhishek Prasad, Cambridge (GB); Ramji Srinivasan, Cambridge (GB); Murray Jarvis, Cambridge (GB); Nicolas Graube, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/485,111

(22) Filed: Oct. 11, 2023

(65) Prior Publication Data

US 2025/0126599 A1 Apr. 17, 2025

(51) Int. Cl.
*H04W 64/00* (2009.01)
*G01S 5/02* (2010.01)

(52) U.S. Cl.
CPC ......... *H04W 64/003* (2013.01); *G01S 5/0258* (2020.05)

(58) Field of Classification Search
CPC ....... H04W 64/003; H04W 4/35; H04W 4/02; H04W 4/33; G01S 5/0258; G06Q 30/0639; G06Q 10/087

(Continued)

(56) References Cited

U.S. PATENT DOCUMENTS 10,444,021 B2 * 10/2019 Hare ........................ G06F 16/29
11,054,529 B2 * 7/2021 Taber ...................... G01S 19/46
(Continued)

FOREIGN PATENT DOCUMENTS

EP 4064191 A1 * 9/2022 ............. G06Q 10/06
WO WO-2017011595 A1 * 1/2017 ............. G01N 33/00
(Continued)

OTHER PUBLICATIONS

International Search Report and Written Opinion—PCT/US2024/041097—ISA/EPO—Oct. 31, 2024.

*Primary Examiner* — Mahendra R Patel
(74) *Attorney, Agent, or Firm* — NORTON ROSE FULBRIGHT US LLP

(57) ABSTRACT

This disclosure provides systems, methods, and devices that support converting position information from a device to positional descriptions with respect to descriptional layouts of assets at a location. In a first aspect, a method of wireless communication includes obtaining position information associated with a user equipment (UE) and retrieving one or more frames of a survey video of a location that correspond to an estimated position of the UE. The estimated position is based on the position information. The method includes extracting a set of features from the one or more frames and outputting a description of the estimated position with respect to a descriptional layout of assets at the location based on one or more descriptions identified from the descriptional layout. The one or more descriptions are identified based on the set of features. Other aspects and features are also claimed and described.

28 Claims, 10 Drawing Sheets

(58) Field of Classification Search
USPC ..................................................... 455/456, 1
See application file for complete search history.

(56) References Cited

U.S. PATENT DOCUMENTS

| | | | | |
|---|---|---|---|---|
| 11,540,742 | B2 * | 1/2023 | Schoepp | A61B 5/061 |
| 11,557,128 | B2 * | 1/2023 | Li | G01S 17/931 |
| 11,690,041 | B2 * | 6/2023 | Smith | H04B 17/318 |
| | | | | 455/456.1 |
| 11,710,309 | B2 * | 7/2023 | Shotton | G06V 20/20 |
| | | | | 382/159 |
| 11,920,934 | B2 * | 3/2024 | Moloney | G01C 21/20 |
| 12,008,719 | B2 * | 6/2024 | McKinnon | G06F 16/29 |
| 2017/0039765 | A1 * | 2/2017 | Zhou | G06T 7/521 |
| 2018/0095653 | A1 * | 4/2018 | Hasek | G06F 3/04883 |
| 2020/0034501 | A1 * | 1/2020 | Duff | G06T 19/006 |
| 2020/0285464 | A1 * | 9/2020 | Brebner | G06N 20/00 |
| 2020/0302510 | A1 * | 9/2020 | Chachek | G06V 20/52 |
| 2021/0173603 | A1 * | 6/2021 | Collet | G06Q 10/087 |
| 2021/0374391 | A1 * | 12/2021 | Jorasch | G06V 40/19 |
| 2022/0051310 | A1 * | 2/2022 | Graube | G06Q 10/087 |
| 2023/0401274 | A1 * | 12/2023 | Denninghoff | G06Q 30/0251 |
| 2024/0337721 | A1 * | 10/2024 | Hirzallah | G01S 5/02524 |

FOREIGN PATENT DOCUMENTS

| | | | | | |
|---|---|---|---|---|---|
| WO | WO-2021141770 | A1 * | 7/2021 | | G06F 18/23211 |
| WO | WO-2023126914 | A2 * | 7/2023 | | G06V 10/761 |
| WO | WO-2023250091 | A1 * | 12/2023 | | G06T 7/60 |
| WO | WO-2024042508 | A1 * | 2/2024 | | G06F 16/29 |

* cited by examiner

Gondola
112A
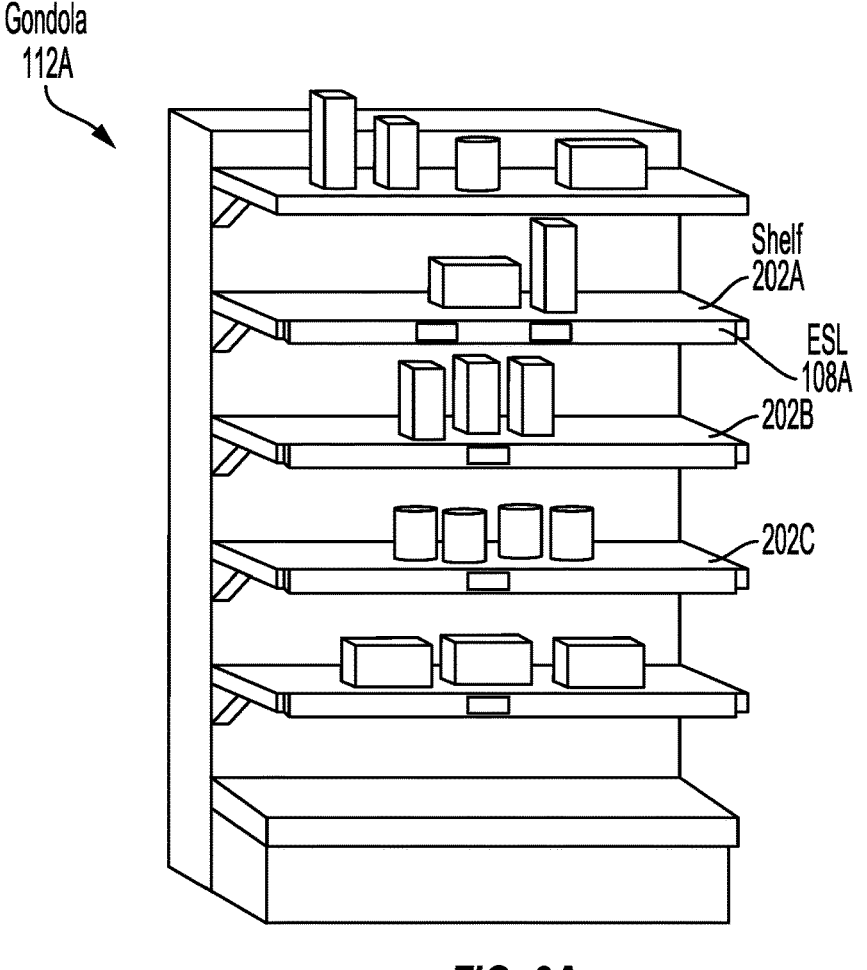
Shelf
202A
ESL
108A
202B
202C
FIG. 2A
ESL
108A
202A          112A
212
210
FIG. 2B
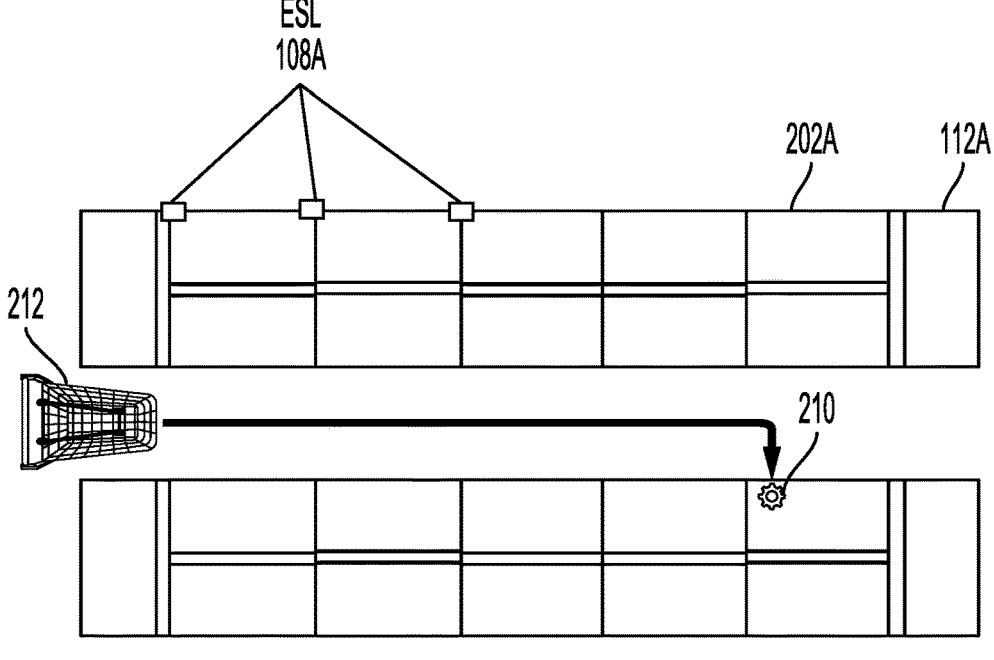

CONVERTING WIRELESS COMMUNICATIONS SYSTEM-BASED POSITIONING TO POSITIONAL DESCRIPTIONS WITH RESPECT TO DESCRIPTIONAL LAYOUTS OF ASSETS

TECHNICAL FIELD

Aspects of the present disclosure relate generally to wireless communication systems, and more particularly, wireless positioning. Some features may enable and provide improved communications, including conversion of wireless communications system-based positioning to positional descriptions with respect to descriptional layouts of assets, which may be leveraged in electronic shelf label (ESL) systems.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to make mistakes, such as mislabeling a shelf or product or forgetting to take down temporary price changes on certain shelving, which results in shopper frustration.

Electronic shelf label (ESL) devices are electronic devices for displaying price information for items on retail store shelves, which may be used in place of paper labels. ESL devices may be attached to a front edge of retail shelving and display a variety of pricing information using display devices, such as Liquid Crystal Displays (LCD). Whenever the information about a product or the location of a product is changed, the ESL device may be programmed with new product information. Thus, the electronic shelf label can be repeatedly used.

ESL systems provide conveniently updatable information regarding the location of assets in a retail location, such as a store, or a storage location, such as a warehouse. Although the ESL devices may display asset names, prices, or other information, such information may not provide a user who is traversing the location with information regarding their position, or the position of other assets. As such, shoppers or stockers may spend significant time traversing the location looking for particular assets or particular positions to store assets. Although some ESL devices may support positioning operations, such operations generate a position that is relative to the position of other ESL devices and that represents a position of the user within the confines of the location, such as a position in a cartesian coordinate system. The user may be able to determine the position of particular assets if they possess a map and their position with respect to the map, but such a map may not exist or may not include up-to-date asset positions, leaving the user to search for the particular assets without guidance.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a device includes at least one processor and a memory coupled to the at least one processor. The at least one processor is configured to cause the device to obtain position information associated with a user equipment (UE). The at least one processor is also configured to cause the device to retrieve one or more frames of a survey video of a location that correspond to an estimated position of the UE. The estimated position is based on the position information. The at least one processor is configured to cause the device to extract a set of features from the one or more frames. The at least one processor is further configured to cause the device to output a description of the estimated position with respect to a descriptional layout of assets associated with the location based on one or more descriptions identified from the descriptional layout. The one or more descriptions are identified based on the set of features.

In an additional aspect of the disclosure, a method of communicating in an ESL system includes obtaining position information associated with UE. The method also includes retrieving one or more frames of a survey video of a location that correspond to an estimated position of the UE. The estimated position is based on the position information. The method includes extracting a set of features from the one or more frames. The method further includes outputting a description of the estimated position with respect to a descriptional layout of assets associated with the location based on one or more descriptions identified from the descriptional layout. The one or more descriptions are identified based on the set of features.

In an additional aspect of the disclosure, a non-transitory, computer-readable medium stores instructions that, when executed by one or more processors, cause the one or more processors to perform operations. The operations include obtaining position information associated with a UE. The operations also include retrieving one or more frames of a survey video of a location that correspond to an estimated position of the UE. The estimated position is based on the position information. The operations include extracting a set of features from the one or more frames. The operations further include outputting a description of the estimated position with respect to a descriptional layout of assets associated with the location based on one or more descriptions identified from the descriptional layout. The one or more descriptions are identified based on the set of features.

In an additional aspect of the disclosure, an electronic shelf label (ESL) system includes a server that includes a memory and at least one processor coupled to the memory and configured to perform operations. The operations include obtaining position information associated with a UE. The operations also include retrieving one or more frames of a survey video of a location that correspond to an estimated position of the UE. The estimated position is based on the position information. The operations include extracting a set of features from the one or more frames. The operations further include outputting a description of the estimated position with respect to a descriptional layout of assets associated with the location based on one or more descriptions identified from the descriptional layout. The one or more descriptions are identified based on the set of features.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Devices, networks, and systems may be configured to communicate via one or more portions of the electromagnetic spectrum. The present disclosure describes certain aspects with reference to certain communications technologies, such as Bluetooth or Wi-Fi. However, the description is not intended to be limited to a specific technology or application, and one or more aspects described with reference to one technology may be understood to be applicable to another technology. Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

For example, the described implementations may be implemented in any device, system, or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (5G NR), 6G, or other known signals that are used to communicate within a wireless, cellular, or internet of things (IoT) network, such as a system utilizing 3G, 4G 5G, or 6G technology, or further implementations thereof.

In various implementations, the techniques and apparatus may be used in wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably and may refer to a collection of devices capable of communicating with each other through one or more communications techniques.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.).

Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, or constitutions.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a device is described as containing components A, B, or C, the device may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2A is a perspective view of a gondola with ESL devices according to some embodiments of the disclosure.

FIG. 2B is a top-down view of a retail environment with ESL devices accessible to a user according to some embodiments of the disclosure.

Like reference numbers and designations in the various drawings indicate like elements.

DETAILED DESCRIPTION

Figures 1A, 1B:
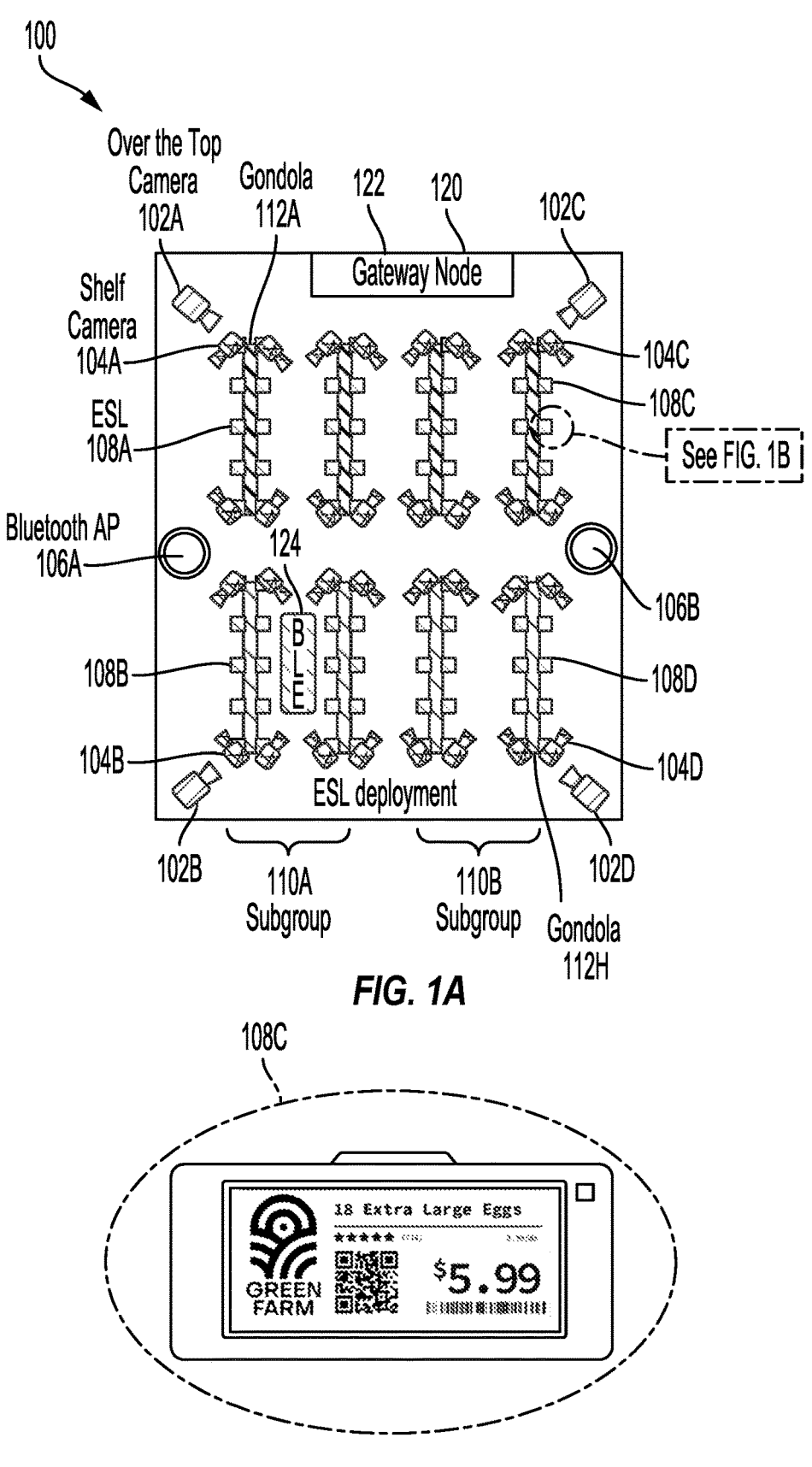
FIG. 1A is a block diagram illustrating an example Electronic Shelf Label (ESL) system according to some embodiments of this disclosure.
FIG. 1B is a diagram illustrating an example display of an ESL device.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support conversion of wireless communications system-based positioning to positional descriptions with respect to descriptional layouts of assets. The conversion of wireless communications system-based positioning is performed by estimating a position of a user equipment (UE), such as based on positioning information derived from positioning operations performed with respect to the wireless communications system, and identifying one or more frames of a survey video of a location that correspond to the estimated position. Object detection may be performed on the one or more frames to identify assets in the frames, signs in the frames, or other such information, and a set of features representing the identified objects and/or signs may be extracted from the one or more frames. The set of features may be used to perform pattern matching on a descriptional layout of assets, such as a planogram or product information database, in order to identify one or more descriptions that correspond to the estimated position. In some implementations, large language model (LLM) artificial intelligence (AI) models may be leveraged to generate descriptions of the set of features for use in performing the pattern matching to descriptions in the descriptional layout. The identified descriptions may be used to output a description of the estimated position of the UE with respect to the descriptional layout, such as a description of the estimated position that is relative to one or more of the assets (e.g., "the user is located in front of canned beans, which are to the left of canned peas") or that is in "retail semantics" (e.g., an aisle label, a gondola label, and a shelf label). In some implementations, the descriptions of the assets position and the estimated position may be primarily or entirely based on signs positioned throughout the location and identified in the one or more frames of the video survey.

Particular implementations of the subject matter described in this disclosure may be implemented to realize one or more of the following potential advantages or benefits. In some aspects, the present disclosure provides techniques for wireless communication systems that enable conversion of wireless communications system-based positioning to more asset-relative positioning. This conversion enables devices to leverage wireless communication-based positioning operations and information used to keep track of assets, such as a planogram or product information database, to generate positional descriptions that have increased utility to a user without requiring additional positioning operations using a different coordinate system or other frame of reference. Such positional descriptions may be more useful to a user and reduce time in orienting themselves with respect to assets that are stored at a location, such as a store or warehouse, than conventional position coordinates. Additionally, converting positioning information to more description-based positioning provides information needed to support a reverse lookup, which can be used to provide directions to particular assets to the user. For example, a shopper in a store may query for directions to bread, and the ESL system may determine directions from the user's current position to the bread, and display such directions in retail semantics such as "move to Aisle 3, look to the right on Gondola 7, the bread is located on the third shelf (below the hamburger and hot dog buns)". Such directions may reduce a user's time spent looking for particular assets, as compared to knowing their positional coordinates with respect to the store but not with respect to the arrangement of the assets. These advantages may be particularly beneficial in electronic shelf label (ESL) systems, which provide an ESL-based positioning framework and, in some implementations, information associated with the position of ESL devices and assets that can be used as, or to supplement, the descriptional layout.

FIG. 1A is a block diagram illustrating an example Electronic Shelf Label (ESL) system according to some embodiments of this disclosure. An ESL system 100 may include a management server 122 that is integrated with or coupled to a gateway node 120. The management server 122 may include at least one processor coupled to a memory, in which the at least one processor is configured to execute computer program code stored on a computer-readable medium to cause the management server 122 to perform operations related to managing operation of the ESL devices 108A-D, the APs 106A-106B, the gateway node 120, and/or other components within the ESL system 100. For example, the management server 122 may perform operations relating to conversion of wireless communications system-based positioning to positional descriptions with respect to descriptional layouts of assets. For example, the management server 122 may perform operations described with reference to FIG. 5, FIG. 6, and/or FIG. 6.

The gateway node 120 may communicate with access point (AP) 106A and access point (AP) 106B. Although only two APs are shown in the example system, fewer or more APs may be included in the ESL system 100. The APs 106A and 106B may communicate through a first communication network, either wired or wireless, with the gateway node 120. The APs 106A and 106B also communicate through a second communication network with Electronic Shelf Label (ESL) tag devices. For example, the APs 106A and 106B may communicate with paired ESL devices in an assigned geographic area. In a first geographic assignment 110A, the AP 106A may communicate with ESL device 108A and ESL device 108B; in a second geographic assignment 110B, the AP 106B may communicate with ESL device 108C and ESL device 108D. The first and second communication networks may be different networks. In some embodiments, the first communication network for communication between AP 106A and gateway node 120 is a Wi-Fi network and the second communication network for communication between AP 106A and ESL device 108A is a Bluetooth network.

Bluetooth technology provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." Each device may belong to multiple piconets. Multiple interconnected piconets may be called scatternets. A scatternet may be formed when a member of a first piconet elects to participate in a second piconet. In the example of FIG. 1, the ESL device 108A may be in a piconet with the AP 106A.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. The ESL device 108A may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an Electronic Shelf Label Profile compliant with the Electronic Shelf Label Profile v1.0 dated Mar. 28, 2023, which is incorporated by reference herein. The ESL Profile may specify how the AP 106A may use one or more ESL Services exposed by the ESL device 108A.

The management server 122 may be implemented as a database (DB) server that stores and manages product information regarding products displayed in a distribution store. The management server 122 may store a variety of information used during the operation of a store, as well as product information. Furthermore, the management server 122 may write and manage command messages that are used to carry out various functions such as the synchronization, updating, and alteration of product information displayed on the ESL devices 108A-108D. The management server 122 may be provided with a database for the ESL devices 108A-108D and product information displayed on the ESL devices 108A-108D. That is, the management server 122 may be provided with a database that stores identification information relating to ESL devices 108A-108D in connection with product information displayed on a corresponding one of the ESL devices 108A-108D.

A command message, created by the management server 122 (e.g., a product-information change message or a management-information acquisition message) can be transferred to the gateway node using a message packaged into a packet suitable for a communication scheme used with the gateway node 120, and transfer the configured packet. Furthermore, the management server 122 may receive a reception acknowledgement message, sent from the gateway node 120, through the communication scheme, convert the received message into a message receivable by the management server 122, and transfer the converted message. The messages may include notifications and/or instructions to change ESL labels or notifications to provide descriptions of positions or directions to user equipments (UEs) or other devices, as described with reference to FIGS. 5-7 and/or FIG. 9.

Although only one gateway node 120 is shown in the ESL system 100, there may be several such gateway nodes communicating with the management server 122. Each gateway node 120 analyzes data received from the management server 122 confirming the presence or absence of a message or data, which is to be sent to the ESL device 108A, and then sends the confirmed message or data to the corresponding ESL device 108A. The gateway node 120 may configure a message, which is to be sent to the ESL device 108A, into a packet according to a communication scheme and send the configured packet to the ESL device 108A through commanding the AP 106A to transmit the packet. Furthermore, the gateway node 120 may transfer a reception acknowledgement message received from the ESL device 108A through the AP 106A to the management server 122.

The ESL devices 108A-108D may include a plurality of ESL devices 108A-108D displaying data concerning product information received from the gateway node 120. The ESL devices 108A-D displaying product information associated with products may be attached to the shelving. One example layout of an ESL system 100 is shown across multiple gondolas 112A-112H. Each of the gondolas 112A-112H may include one or more shelves, to which the ESL devices 108A-108D are attached. The ESL device 108A-108D may be configured as shown, for example, in FIG. 4, with the microcontroller configured to perform operations described with reference to FIGS. 5-6 and/or FIG. 9.

In some embodiments, a video monitoring system may be included as part of ESL system 100 or used to augment the capabilities of the ESL system 100. For example, shelf cameras 104A-104D may be positioned with a field of view that captures one or more shelves of one or more of the gondolas 112A-112H. The shelf cameras 104A-104D may be used to assist in tracking stock levels and/or identifying items picked by users while in the environment. As another example, over-the-top (OTT) cameras 102A-102D may be positioned with a field of view capturing large regions of an environment of the ESL system 100. Object recognition systems may be applied to received image frames from the cameras 102A-D or 104A-D to determine a presence of, or count of, objects and humans in the field of view of a respective camera.

The OTT cameras 102A-102D may be used to support determination of a position of an ESL device 108A-D, user mobile device, or other devices within the environment. A mobile device supporting Bluetooth Low Energy (BLE), such as BLE device 124, may traverse the environment and communicate with the ESL devices 108A-108D, for example to receive identification information from the ESL devices 108A-108D, with the location of the ESL devices 108A-D determined by identifying a location of the BLE device 124 from the camera image frames at the time the BLE device 124 receives signals, and/or the strength of the signals, received from the ESL devices 108A-108D.

The ESL devices 108A-108D may change price information or be activated or inactivated while communicating with the gateway node 120. A store manager may send the management server 122 a command concerning the synchronization between a product and the ESL device 108A and/or a command for the correction of information regarding a product assigned to the ESL device 108A. An example ESL device display of ESL device 108C is shown in FIG. 1B, with such a device displaying information including a product description, a product image, a product price, a product barcode, a product rating, a product Stock Keeping Unit (SKU), and/or a product link (e.g., a URL or QR code).

As described earlier, the environment may include ESL devices organized on gondolas and shelves. One example illustration of such an arrangement is shown in FIG. 2A. FIG. 2A is a perspective view of a gondola with Electronic Shelf Label (ESL) devices according to some embodiments of the disclosure. The gondola 112A may include multiple shelves 202A-202C at different vertical levels from a floor. ESL devices may be attached to the shelves 202A-202C. For example, ESL device 108A may be attached to shelf 202A to display information regarding products stocked on shelf 202A in the vicinity of the ESL device 108A.

The ESL devices may provide information to a shopper or store employee operating in the environment, such as to provide information regarding products and/or assist with location determination of products or the user. FIG. 2B is a top-down view of a retail environment with Electronic Shelf Label (ESL) devices accessible to a user according to some embodiments of the disclosure. A user pushing a shopping cart 212 through an aisle may use ESL devices to determine the location of a particular product. For example, a mobile device associated with the shopping cart 212 may guide a user to location 210 where stock for a desired product is located.

Figure 3:
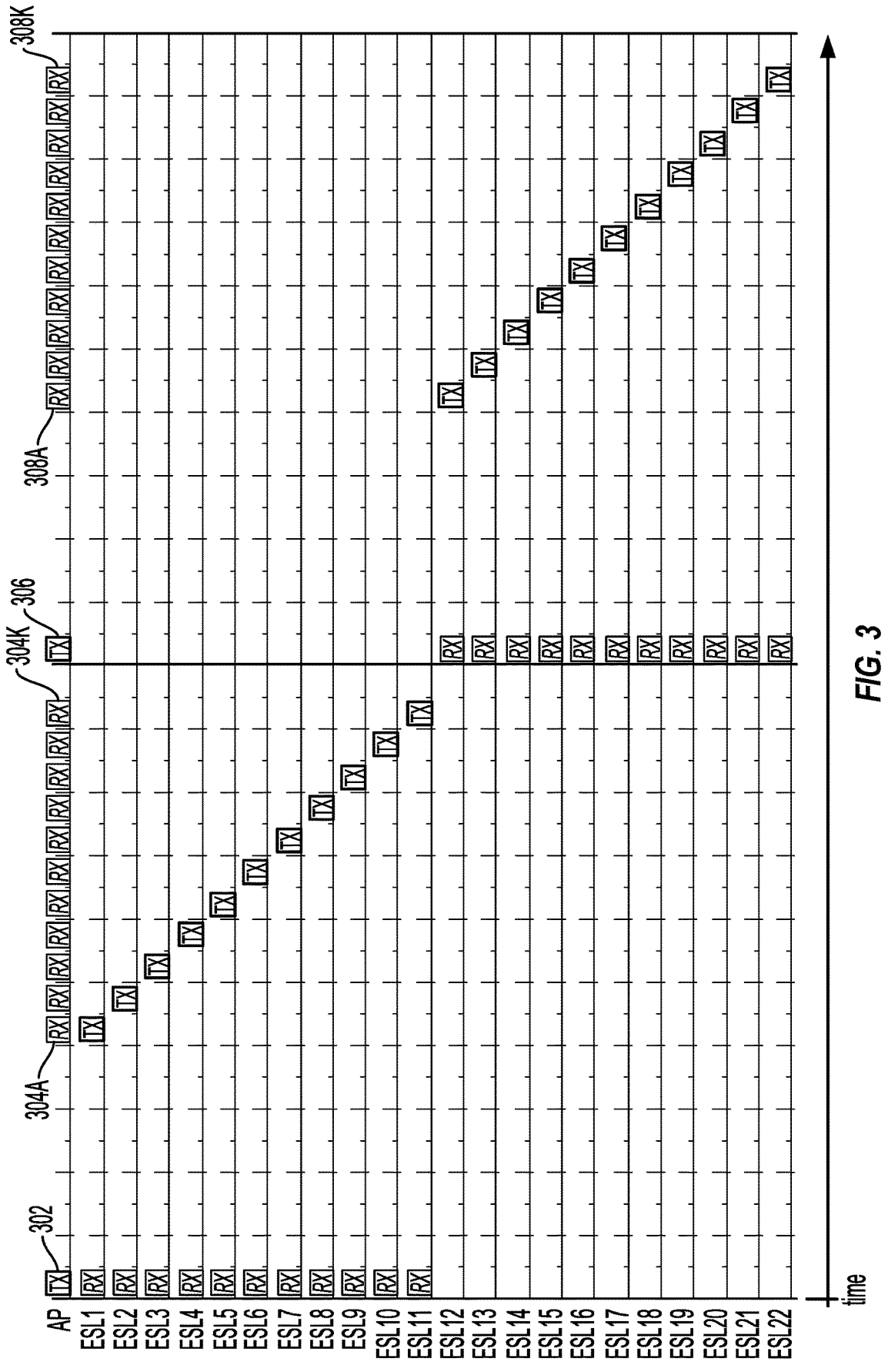
FIG. 3 is a timing diagram illustrating time division multiplexing for communicating with multiple ESL devices according to some embodiments of the disclosure.

Communication within the ESL system 100 between an AP and ESL devices may be performed according to a Time Division Multiple Access (TDMA) scheme, such as one illustrated in FIG. 3. FIG. 3 is a timing diagram illustrating time division multiplexing for communicating with multiple ESL devices according to some embodiments of the disclosure. An AP, such as AP 106A, may broadcast information that is received by all ESL devices, including ESL device 108A, during a first time period 302. The ESL devices may communicate with the AP during subsequent time periods. For example, a first ESL device, such as ESL device 108A, may transmit in time period 304A, with other ESL devices transmitting in time periods 304B-304K. In ESL systems with significant numbers of ESL devices, the ESL devices may be configured to communicate in different groups. For example, ESL devices 1-11 may be configured to transmit to the AP during a first time cycle and ESL devices 12-22 may be configured to transmit to the AP during a second time cycle. The first and second time cycles may alternate during operation of the wireless network. For example, after transmission by ESL devices 1-11 during time periods 304A-304K, the AP may transmit during a second time period 306, and ESL devices 12-22 may transmit in time periods 308A-308K, respectively.

Figure 4:
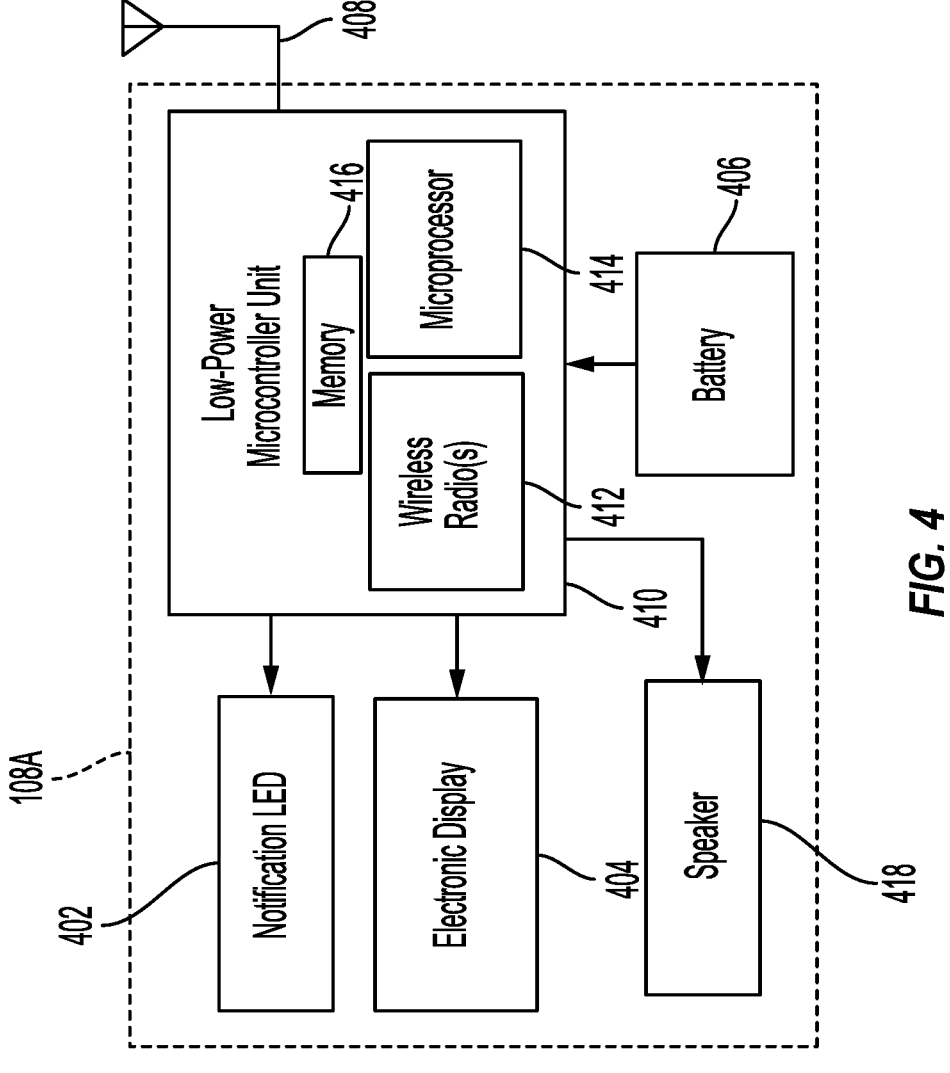
FIG. 4 is a block diagram illustrating an example ESL device according to some embodiments of this disclosure.

An ESL device may include components configured together to provide some or all of the functionality described in this disclosure and/or provide additional functionality. FIG. 4 is a block diagram illustrating an example ESL device according to some embodiments of this disclosure. The ESL device 108A may include a low-power microcontroller 410. Although functionality for the ESL device 108A may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described in embodiments of this disclosure. Although shown as part of the microcontroller 410, the memory 416 may be located internal to or external to the microcontroller 410. The microcontroller 410 may also include one or more wireless radio(s) 412. The wireless radio(s) 412 may include, for example, a Bluetooth wireless radio including a front end that couples to antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 108A may include I/O devices, such as a notification LED 402 and/or an electronic display 404. The notification LED 402 may include one or more light emitting diodes (LEDs), or other light sources configured to flashlight of one or more colors. The notification LED 402 may be triggered to blink at a specific time and/or with a specific color based on a command received from the gateway node 120. For example, the notification LED 402 may blink to attract a user's attention to a particular location on a shelf. The electronic display 404 may be, for example, an electronic-ink (e-Ink) display configured to output the product information.

The ESL device 108A may couple to a battery 406 or other power source to power operations performed by the ESL device 108A, such as to operate the wireless radio(s) 412, the notification LED 402, the electronic display 404, the memory 416, and/or the microprocessor 414. The battery 406 may allow placement of the ESL device 108A in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 108A may operate using a wakeup communication scheme. That is, the ESL device 108A wakes up according to predetermined time intervals to determine whether data is waiting to be received. When no data is waiting, power to the ESL device 108A is turned off until the next wakeup period to reduce power consumption. When there is data to be received, the ESL device 108A wakes up to perform communication operations.

Figure 5:
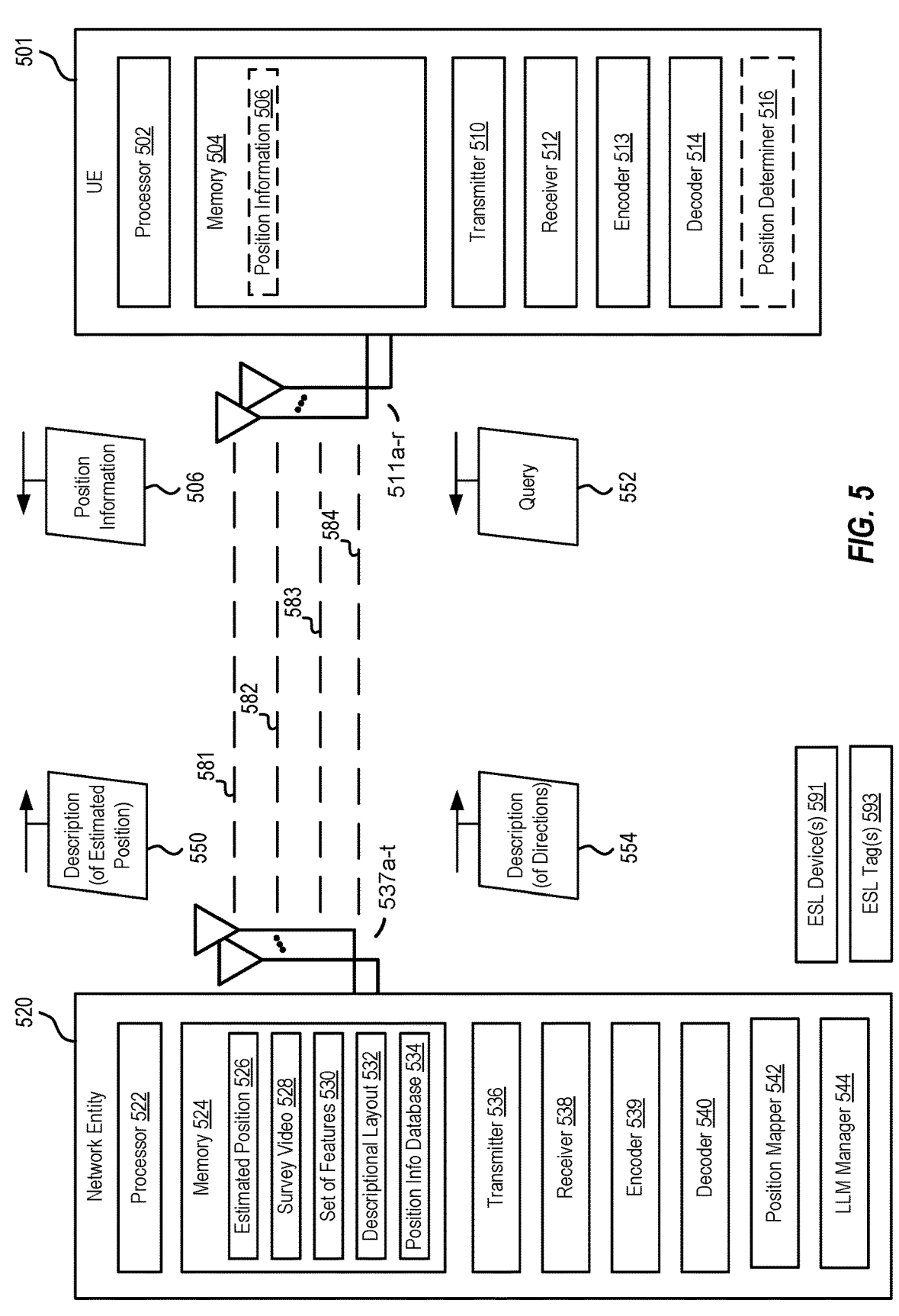
FIG. 5 is a block diagram illustrating an example wireless communication system that supports conversion of wireless communications system-based positioning to positional descriptions with respect to descriptional layouts of assets according to one or more aspects of this disclosure.

FIG. 5 is a block diagram illustrating an example wireless communications system 500 that supports conversion of wireless communications system-based positioning to positional descriptions with respect to descriptional layouts of assets according to some aspects of the disclosure. As illustrated in the example of FIG. 5, the wireless communications system 500 includes a UE 501 and a network entity 520. Although one network entity 520 and one UE 501 are illustrated in FIG. 5, in other examples, the wireless communications system 500 may include multiple network entities 520 and/or multiple UEs 501. In some examples, the wireless communications system 500 may implement aspects of ESL system 100. For example, the wireless communications system 500 may include an ESL network, such as ESL infrastructure including one or more ESL devices or network entities, and one or more wireless devices which interact with the ESL infrastructure. In such examples, network entity 520 may include or correspond to an ESL device, such as an ESL controller or an ESL server, and the wireless devices may include UEs, such as UE 501. In some such implementations, the wireless communications system 500 may optionally include one or more ESL devices (hereinafter referred to collectively as "ESL devices 591"), one or more ESL tags (hereinafter referred to collectively as "ESL tags 593"), or a combination thereof.

The network entity 520 may include or correspond to an entity in a wireless network, such as a base station, an access point, a server, a router, a switch, another network entity, or a component or a combination thereof. Alternatively, network entity 520 may include or correspond to any of the ESL devices or infrastructure described herein, including the gateway node 120, the management server 122, an ESL AP (e.g., the AP 106A or 106B), an ESL device or controller (e.g., ESL devices 108C or 108D), an ESL tag device (e.g., IoT Tags) as in FIG. 1A, or the ESL device 400 of FIG. 4. An ESL controller may include one or more ESL devices and a wireless radio and be referred to as an ESL rail controller. Such an ESL controller may wirelessly communicate and control one or more ESL devices, such as ESL devices 591 that include displays and are configured to output information based on data received from the ESL controller, or ESL tags 593 that are configured to be attached to assets and provide positioning information related to the assets. Alternatively, an ESL controller may be included in or integrated in an ESL AP, an ESL hub, a server, or the like, that is configured to perform the operations described herein.

In some such ESL-based implementations, the UE 501 (or another type of wireless device) may interact with ESL infrastructure or an ESL device. The UE 501 may be part of the ESL infrastructure or separate from the ESL infrastructure. For example, the UE 501 may be associated with a worker or a robot, or with a customer/shopper. The may interact with any of network entity 520 (which may be an ESL device), the ESL devices 591, the ESL tags 593, or a different type of ESL device. As illustrative, non-limiting examples, the network entity 520 may include or correspond to an ESL controller, an ESL AP, a server, or the like, as described above. The ESL devices 591 may include or correspond to an ESL device which is the same type as or a different type from a type of the network entity 520. For example, network entity 520 may communicate with and control ESL devices 591, which are coupled to displays associated with various assets or asset groups. The ESL tags 593 (e.g., IoT tags) may include or correspond to passive or battery-less radios which may output a signal or beacon based on received RF energy. The ESL tags 593 may be coupled to or associated with one or more products or assets of the ESL system. In a particular implementation, the ESL devices 591 may include an energizer device configured to provide RF energy to the ESL tags 593 and/or trigger the ESL tags 593 to broadcast beacons for measurement.

Network entity 520 and UE 501 may be configured to communicate via one or more portions of the electromagnetic spectrum. For example, the network entity 520, the UE 501, or both, may be configured to communicate via one or more portions of the electromagnetic spectrum associated with Bluetooth transmissions, Wi-Fi transmissions, Zigbee or Z-wave transmissions, local area network (LAN) transmissions, personal area network (PAN) transmissions, or cellular transmissions (including sub-6 GHz and 6 GHz).

Network entity 520 and UE 501 may be configured to communicate via one or more channels or component carriers (CCs), such as representative first channel 581, second channel 582, third channel 583, and fourth channel 584. Although four channels are shown, this is for illustration only, more or fewer than four channels may be used. One or more channels may be used to communicate control channel transmissions, data channel transmissions, and/or sidelink channel transmissions between network entity 520 and UE 501.

Each channel or CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more channels or CCs may have or be assigned to a Cell ID, or a Bandwidth Part (BWP) ID. The Cell ID may include a unique cell ID for the channel or CC, a virtual Cell ID, or a particular Cell ID of a particular channel or CC of the plurality of channels or CCs. Additionally, or alternatively, one or more channels or CCs may have or be assigned to a HARQ ID. Each channel or CC may also have corresponding management functionalities, such as, beam management or BWP switching functionality. In some implementations, two or more channels or CCs are quasi co-located, such that the channels or CCs have the same beam and/or same symbol.

In some implementations, control information may be communicated via network entity 520 and UE 501. For example, the control information may be communicated using Bluetooth transmissions, Zigbee or Z-Wave transmissions, Wi-Fi transmission, MAC-CE transmissions, RRC transmissions, DCI (downlink control information) transmissions, UCI (uplink control information) transmissions, SCI (sidelink control information) transmissions, other types of transmissions, or a combination thereof.

UE 501 can include a variety of components (e.g., structural, hardware components) used for carrying out one or more functions described herein. For example, these components can include processor 502, memory 504, transmitter 510, receiver 512, encoder 513, decoder 514, position determiner 516, and antennas 511a-r. Processor 502 may be configured to execute instructions stored at memory 504 to perform the operations described herein. In some implementations, processor 502 includes or corresponds to the micro-controller 410 and/or the microprocessor 414 of FIG. 4, and memory 504 includes or corresponds to the memory 416 of FIG. 4. Memory 504 may also be configured to store position information 506. The position information 506 includes or corresponds to data associated with or corresponding to a position of UE 501. The position indicated by the position information 506 may include or correspond to signaling-based position which may determined based on communications within wireless communication system 500. For example, the position information 506 may include data used for determining a position (e.g., measurement data, ephemeris, fingerprint data, etc.), data indicating a position (e.g., position coordinates or relative positioning data), data indicating formulas or methods for calculating a position, or a combination thereof. Additionally or alternatively, the position information 506 may be information related to a graph of interrelated elements that are derived from survey video 528, where each vertex of the graph corresponds to a feature and edges between the vertices define proximity and directionality information. In such examples, the direction is relative to the specific video from which the features are extracted and is reconciled when a graph based on one video is combined with other graph(s) based on other video(s) to generate a combined graph that enables determination of a coherent orientation of a camera with respect to all combined videos (e.g., from which 'anchors' can be extracted that indicate directions such as left, right, up, and down). The position information 506 may enable the generation of notifications (e.g., notification information, indications and/or instructions) or may enable determination of an estimated position (e.g., such as estimated from one or more signal measurements). The position information 506 may include original positions and/or determined or updated positions. In some implementations in which wireless communications system 500 supports an ESL system, the position information 506 is determined based on measurement information associated with ESL system information and/or ESL wireless transmissions.

Transmitter 510 is configured to transmit data to one or more other devices, and receiver 512 is configured to receive data from one or more other devices. For example, transmitter 510 may transmit data, and receiver 512 may receive data, via a network, such as a wired network, a wireless network, or a combination thereof. For example, UE 501 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 510 and receiver 512 may be replaced with a transceiver. Additionally, or alternatively, transmitter 510 or receiver 512 may include or correspond to one or more components of ESL device 108A described with reference to FIG. 4.

Encoder 513 and decoder 514 may be configured to encode and decode data for transmission. Position determiner 516 may be configured to perform position determination and management operations. For example, the position determiner 516 may be configured to determine positions based on measurement information and signaling. For example, the position determiner 516 may be configured to determine one or more positions of UE 501 based on measurements of signals from other network devices, such as network entity 520. Additionally or alternatively, position determiner 516 may be configured to determine one or more positions of UE 501 based on measurements of beacons and/or reference signal(s) or responses to the beacons and/or reference signal(s). Additionally, the position determiner 516 may be configured to extract position or location information of other network or ESL devices from other network or ESL transmissions. The position information 506 determined by the position determiner 516 may be used to generate textual descriptions of an estimated position of UE 501, as further described herein.

Although one UE (i.e., UE 501) is shown in the example of FIG. 5, in other implementations, the network may include additional wireless devices which interact with wireless communications system 500. The other wireless device or devices may include one or more elements similar to UE 501. In some implementations, the UE 501 and the other wireless device or devices are different types of UEs. For example, either UE 501 may be a higher quality or have different operating constraints than the other UEs, or vice versa. To illustrate, one of the UEs (either UE 501 or another UE) may have a larger form factor or be a current generation device, and thus have more advanced capabilities and/or reduced battery constraints, higher processing constraints, etc. As another example, one UE may be associated with a person and the other UE may be associated with a robot or autonomous device.

Network entity 520 includes processor 522, memory 524, transmitter 536, receiver 538, encoder 539, decoder 540, position mapper 542, LLM manager 544, and antennas 537a-t. Processor 522 may be configured to execute instructions stores at memory 524 to perform the operations described herein. In some implementations, processor 522 includes or corresponds to low-power microcontroller 410 and/or microprocessor 414, and memory 524 includes or corresponds to memory 416 of FIG. 4. Memory 524 may be configured to store estimated position 526, survey video 528, set of features 530 (e.g., a set of one or more features), descriptional layout 532, position information database 534, or a combination thereof, as further described herein.

Transmitter 536 is configured to transmit data to one or more other devices, and receiver 538 is configured to receive data from one or more other devices. For example, transmitter 536 may transmit data, and receiver 538 may receive data, via a network, such as a wired network, a wireless network, or a combination thereof. For example, UEs and/or network entity 520 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 536 and receiver 538 may be replaced with a transceiver. Additionally, or alternatively, transmitter 536 or receiver 538 may include or correspond to one or more components of ESL device 108A described with reference to FIG. 4.

Encoder 539 and decoder 540 may include the same functionality as described with reference to encoder 513 and decoder 514, respectively. Position mapper 542 may be configured to map position information to estimated positions of devices within the network. For example, the position mapper 542 may be configured to map location information related to UE 501, such as signal measurements of device signaling or ephemeris, to an estimated position of UE 501, such as coordinates within a cartesian coordinate system. The LLM manager 544 may be configured to manage operations of an artificial intelligence (AI) large language model (LLM) to generate descriptions for use in converting wireless communications system-based positioning to positional descriptions with reference to descriptional layout 532. For example, the LLM manager 544 may be configured to generate one or more prompts to be provided to the LLM as input, to facilitate communication with and/or operation of the LLM, or both, to generate artificially created text output, such as words, phrases, sentences, paragraphs, or other documents, based on the input. In some implementations, such text output includes descriptions of features, description of positions, descriptions of signs, or a combination thereof, as further described herein.

As further described below, the wireless communications system 500 enables conversion of wireless communications system-based positioning to positional descriptions with respect to descriptional layouts of assets using survey video 528. Survey video 528 may include a plurality of video frames (e.g., images) captured by a video capture device while a user navigates throughout a location holding the video capture device. For example, in a retail context, an employee of a store may walk throughout the store using a mobile phone (e.g., a UE) to capture video of products on shelves of gondolas in various aisles. As another example, a robot may traverse the aisles of the warehouse recording video of items stored on various shelves, in storage bays, or other storage areas. Additionally or alternatively, the video capture device may be a fixed camera, such as one or more closed circuit television (CCTV) or security cameras, or video captured by a mobile device may be supplemented by video captured by fixed cameras or other types of video capture devices. As used herein, an asset refers to any product, item, or other element being stored, displayed for sale, contained for use, or otherwise positioned such that positioning of the asset relative to other assets is useful information to enable efficient movement to the asset by a customer, employee, or the like. Each frame, or a subset of frames, of survey video 528 are associated with position data, such as cartesian coordinates (e.g., x, y, z coordinates) at which the respective frame of video is captured within the location, and optionally with a timestamp at which time the respective frame of video is captured.

A survey system problem can be defined as, for any t in survey interval (time), a function is defined, mapping time to position. The purpose of the track reconciliation is to define such function (or functions). Thus, for any element T in a subset of R that is defined by $[ts_i \ldots ts_j]$:

$\forall t$ in $[ts_i \ldots ts_j]$, F: $T \rightarrow P$ is defined, with $T \in \mathbb{R}$ and $P \in \mathbb{R}^3$ Using an uncontrolled (e.g., casual) video of a scene, such as the survey video 528, structure-from-motion (SFM) can be used to estimate the structure and pose (e.g., orientation and position) of the camera capturing the video. Video capture may be done concurrently to that of capturing sensor data or performing radio-based positioning. As such, a device that captures the video, or another device, may collect observations from any type of signal or sensor which may, later on, be used within a position determination function. The determination of a function that reconciles time to position, and which is derived from the video alone, may permit the mapping between the observations and position (e.g., through a timestamp or other time measurement). In this manner, ephemeris may be generated, which are assistance information used in the process of determining or estimating a position. Additionally, processing couples that include <collected data, position> can be used to determine or estimate the position of signal sources (e.g., a WiFi Access Point (AP), an ESL AP, etc.), or ascribe a "fingerprint" of a signal (e.g., an RF signal or a Magnetometer signal) to a specific position. The above-described inferred information can then be collected in the ephemeris which may then used to assist in indoor positioning of an entity such as a mobile device held by a customer, a robot stocking a warehouse, or the like. In such examples, indoor positioning (e.g., $P \in \mathbb{R}^3$) is typically represented in a coordinate system that is consistent with the survey coordinate system, such as the position coordinates with the store or other location. However, mapping a calculated or estimated indoor position from the survey coordinate system to a retail store coordinate system, or other venue coordinate system, can be challenging and typically requires a detailed and up-to-date floor plan that also includes asset location information. To solve this problem, the wireless communications system 500 automatically extracts semantic information from the survey video 528 using multimodal artificial intelligence (AI) to generate descriptions of positions in the retail store coordinate system (e.g., using "retail semantics") or other venue coordinate system. The sematic information may provide cues for navigation, such as "tomato sauce is in aisle 4, on the left of shelf 4." If user position is estimated from a positioning system, then waypoint guidance of this sort may be provided to the user to navigate them to products, such as by providing the following in response to a query for tomato ketchup: "the tomato ketchup is on this aisle on the left, after the spaghetti sauces." If user position information is not known, then an image of the user's current position, such as an image captured through a mobile device or through XR/VR glasses, may be used to relate where the user is relative to the semantic map and thereby provide navigation.

During operation of wireless communications system 500, an entity (e.g., a customer, a stock picker, a warehouse employee, etc.) may be carrying the UE 501 (e.g., a mobile phone) within a location, such as a retail location or a warehouse. The network entity 520 may obtain position information 506 associated with UE 501 based on one or more positioning operations. As an example, network entity 520 (or one of ESL devices 591 or ESL tags 593) may transmit a beacon, and ESL devices 591, ESL tags 593, and UE 501 may transmit one or more beacon responses. For example, network entity 520 may be an ESL controller that is associated with a plurality of ESLs (e.g., ESL devices 591), and each of ESL devices 591 is associated with one or more of the ESL tags 593 that correspond to one or more of the assets and that transmit beacon responses when network entity 520 transmits a beacon. As another example, network entity 520 may be an edge or cloud server that is associated with a plurality of ESL access points (APs) (e.g., ESL devices 591), and each of ESL devices 591 may transmit beacon responses when network entity 520 transmits a beacon. Alternatively, network entity 520 may provide one or more reference signals to devices of wireless communications system 500 and/or may communicate with one or more other network devices. Network entity 520 may generate one or more measurements based on the beacon responses or other signaling, such as a received signal strength indicator (RSSI), a reference signal received power (RSRP), an angle-of-arrival (AoA), or a combination thereof, as non-limiting examples. Because network entity 520 may know the location of at least some of ESL devices 591, the signal measurements based on their beacon responses and the beacon response from UE 501 may be used to determine position information 506. Additionally or alternatively, network entity 520 may perform one or more measurements to generate ephemeris that can be mapped to position data based on survey video 528. Alternatively, UE 501 may perform the positioning operations and transmit position information 506 to network entity 520. For example, UE 501 may include position determiner 516 that is configured to perform wireless communications system-based positioning, such as based on signal measurements of beacons and/or beacon responses, similar to as described with reference to network entity 520. In some implementations, position information 506 may include or be based on RF fingerprints (e.g., based on the above-described signal measurements) and sensor data from network entity 520 or UE 501. As a non-limiting example, UE 501 may include a GPS sensor or a GNSS sensor (or other types of sensors), and UE 501 may provide positioning coordinates determined from the sensor data to network entity 520 as position information 506.

After obtaining position information 506, position mapper 542 may map position information 506 to estimated position 526 to generate an estimated position of UE 501 within the location. For example, position mapper 542 may map a relative location of UE 501 to ESL devices 591 and/or ESL tags 593 (or other devices) or a location that is given by an RF fingerprint or signal measurements to estimated position coordinates (e.g., estimated position 526), such as with reference to a coordinate system of the location. If other sensor data is included in position information 506, other types of mapping may be performed by position mapper 542. In some implementations, position mapper 542 also manages and controls positioning operations performed by network entity 520, such as transmission of beacons, measurement of beacon responses, and determination of RSSI, RSRP, AOA, or the like.

After determining the estimated position 526 of UE 501, network entity 520 may retrieve one or more frames of survey video 528 that correspond to estimated position 526. For example, each frame of survey video 528 may be tagged or associated with a position at which the video was captured, and network entity 520 may retrieve one or more frames that are associated with position coordinates (or another form of positioning data) that matches estimated position 526. As described above, survey video 528 may be captured by an entity, such as a store employee, that walks about the location capturing video, and the frames of survey video 528 may be tagged with position information generated by the video capture device at the position at which the frames were captured and/or at positions and poses of the video capture device that are estimated using SFM on survey video 528. In some implementations, each frame of survey video 528 may also be associated with a time stamp, and network entity 520 may retrieve frames that are associated with a position that matches the estimated position 526 in addition to one or more frames that come temporally before or after the matching frames, based on the timestamps. For example, network entity 520 may be configured to retrieve a particular number of frames, and if enough matching frames are not identified, the remaining frames may be supplemented by frames from before or after the time of the matching frames. As another example, network entity 520 may be configured to extract a particular number of features to use for pattern matching, as further described below, and if the matching frames do not provide a sufficient number of features, additional frames from before or after the matching frames may be provided for use in extracting additional features.

After selecting one or more frames from survey video 528, network entity 520 may extract set of features 530 from the selected frames. The features may be used to identify or be associated with one or more elements in the selected frames (e.g., images), such as products, signs, labels, colors, patterns, other elements, or a combination thereof. For example, set of features 530 may include products identified in the selected frames, text of signs or labels in the selected frames, directional features with respect to one or more detected objects in the selected frames, geometric descriptions of the selected frames, spatial descriptions of the selected frames, text descriptions of the selected frames, other features, or a combination thereof. To extract the set of features 530, network entity 520 may perform object detection on the selected frames to detect one or more objects within the selected frames. These objects may be detected using object detection and object tracking image processing techniques, and features that represent the detected objects may be extracted as at least a portion of the set of features 530. As a non-limiting example, network entity 520 may perform object detection on the selected images and detect a can of tomatoes, a box of noodles, a label on the box of noodles, and a sign above the can of tomatoes and the box of noodles. The extracted features may include text from the sign, text from the label, a feature indicating tomatoes, a feature indicating noodles, shape features associated with the can or the box, spatial or directional features (e.g., the sign is above the can of tomatoes, which is to the left and above the box of noodles), and color features (e.g., that the can is green and the box is red). Additional types of image processing operations may also be performed, such as object tracking, text recognition, thresholding, and other operations. These features may be used to perform pattern matching, or used to generate descriptions that are used to perform pattern matching, as further described herein.

After extracting the set of features 530, network entity 520 may identify one or more descriptions from descriptional layout 532 based on the set of features 530. The descriptional layout 532 may include asset names, asset descriptions, and asset positions that are catalogued and associated based on the arrangement of assets in the location. Stated another way, descriptional layout 532 includes text that represents a visual description of assets and their positions within the location. As such, descriptional layout 532 may include or correspond to a planogram of a store or a database of products and their respective positions. Descriptional layout 532 may include description of the appearance of products, names of the products, spatial relationships between at least some of the products, positions in "retail semantics" (or other context semantics) such as aisle numbers, gondola numbers, and shelf numbers, other descriptions, or a combination thereof. As a non-limiting example, descriptional layout 532 may include entries for products, and each entry may include a product name, a product container (e.g., box, jar, bag, etc.), a product color, an aisle number of an aisle that contains the product, a gondola number of a gondola that contains the product, and a shelf number of a shelf that contains the product. This example is illustrative, and in other implementations, fewer elements, more elements, or different elements may be included in descriptional layout 532. The descriptional layout 532 may be created and maintained by an entity that owns the location, such as an owner or manager, and may be changed based on changes to inventory, arrangement, and other situations. Because descriptional layout 532 does not include exact positioning information (e.g., coordinates of positions of assets within the location), maintaining and updating the descriptional layout 532 may be easier and more efficient than maintaining a map of the location with asset position information.

To identify the one or more descriptions that represent assets at the same position as UE 501, network entity 520 may perform pattern matching between set of features 530 and descriptional layout 532 to identify the one or more descriptions that most closely match the set of features 530. For example, network entity 520 may compare set of features 530, or textual descriptions thereof, to asset names included in the descriptional layout 532, asset positions included in the descriptional layout 532, asset containers, shapes, or colors included in the descriptional layout 532, to identify descriptions of assets that are most similar to the set of features 530 (or descriptions derived therefrom). In some implementations, at least a portion of a description in descriptional layout 532 is the same as one of the features of the set of features 530 in order for a match to be detected. Alternatively, the features (or descriptions based on the features) may be compared to one or more of the descriptions in the descriptional layout 532 to generate respective similarity scores (or other metrics), and for pairs of features and descriptions for which the similarity score satisfies a threshold, matches may be detected. The threshold may be set based on competing considerations of precision of match and preventing false negatives.

Network entity 520 may utilize artificial intelligence (AI) models and logic to aid in the process of identifying descriptions in descriptional layout 532 that match set of features 530. In some implementations, LLM manager 544 is configured to generate prompts based on the set of features 530 and to use these prompts as input data to an AI large language model (LLM), such as ChatGPT, BERT, or the like, to generate textual descriptions of the set of features 530. These textual descriptions may be used in the pattern matching to identify matching descriptions from the descriptional layout 532. As a non-limiting example, if set of features 530 includes features indicating a shape of a can, a red label that contains the word "tomato," and a directional feature that indicates below a blue box, LLM manager 544 may combine the features with a prompt template or otherwise generate a prompt that causes an AI LLM to output the description "a red tomato can is on a shelf below a blue box". In this example, the text description may be more likely than the individual features themselves to be matched to a description from the descriptional layout 532 that includes "Canned tomatoes are red cans labeled tomato in aisle 4, gondola 2, shelf 3, below the boxes of spaghetti noodles." The LLM may be included in or integrated in network entity 520, and managed by LLM manager 544, or the LLM may be maintained at an external network connection, such as a company server or a cloud server, and accessed by the LLM manager 544. Using the LLM in this manner may generate textual descriptions, or more user friendly and semantically relevant textual descriptions, of the set of features 530 for matching to the descriptional layout 532.

Additionally, or alternatively, LLM manager 544 may use an AI LLM to perform the above-described pattern matching. To illustrate, an LLM may be trained with the information included in descriptional layout 532 such that LLM manager 544 may be able to ask questions of the LLM, and the LLM provide the descriptions that are most similar to the questions. In such implementations, LLM manager 544 may generate a prompt based on the set of features 530, such as by combining some of the features with a question or other prompt template or otherwise generate a question prompt to be provided to the LLM. Based on receiving the prompt as input data, the LLM may output a text output that includes one or more descriptions that most closely match (e.g., are most similar to) the information in the prompt (e.g., a question based on the set of features 530). For example, the LLM manager 544 may generate a prompt that includes "where is a can with a red label that is below a blue box", and the LLM may output "Canned tomatoes are red cans labeled tomato in aisle 4, gondola 2, shelf 3, below the boxes of spaghetti noodles."

Although described as the network entity 520 generating the descriptions and/or questions for the LLM, in some other implementations, UE 501 may include or access an LLM and perform at least some of the above-described operations. In some such implementations, network entity 520 may transmit the set of features 530 to UE 501, and UE 501 may generate descriptions of the set of features 530 by generating prompts based on set of features 530 and providing the prompts as input to the LLM. Additionally, or alternatively, UE 501 may generate questions for an LLM that is trained based on the descriptional layout 532. In these implementations, security of the descriptional layout 532 and the survey video 528 is preserved by storing them at, or accessible to, network entity 520 and having network entity 520 provide the set of features 530 to UE 501, while offloading the AI interaction to UE 501. After the descriptions or questions have been generated by the LLM, UE 501 may transmit the descriptions or questions to network entity 520 for use in performing the pattern matching with respect to the descriptional layout 532. Configuring the UE 501 to interact with the LLM instead of the network entity 520 may enable less complex and computational resource intensive devices to operate as network entity 520. Alternatively, if network entity 520 is a server or other device capable of performing such operations, assigning them to network entity 520 may enable UEs of lesser complexity to participate in the positioning conversion services described herein.

After identifying one or more descriptions from descriptional layout 532 that match or are most similar to set of features 530, network entity 520 may output a description 550 of the estimated position 526 with respect to the descriptional layout 532. For example, network entity 520 may transmit description 550 to UE 501 for display to a user via a touch screen, an audio output, or another form of output. In some implementations, description 550 may be relative to one or more of the assets, such as indicating relative position of nearby assets. Additionally or alternatively, description 550 may be in "retail semantics", and as such may include an aisle label, a gondola label, a shelf label, or a combination thereof. In other implementations, description 550 may be in semantics related to other contexts, such as a warehouse, a hangar, or other storage locations. In some implementations, LLM manager 544 may generate a prompt based on the identified descriptions, and LLM manager 544 may provide the prompt as input to the LLM to generate description 550. Using the LLM to generate a description of a position may result in a more user-friendly, grammatically correct, and/or semantically relevant description of position than sourcing the description directly from the descriptional layout 532. Additional details of a pipeline configured to perform at least some of the above-described operations is further described herein with reference to FIG. 6.

Figure 8:
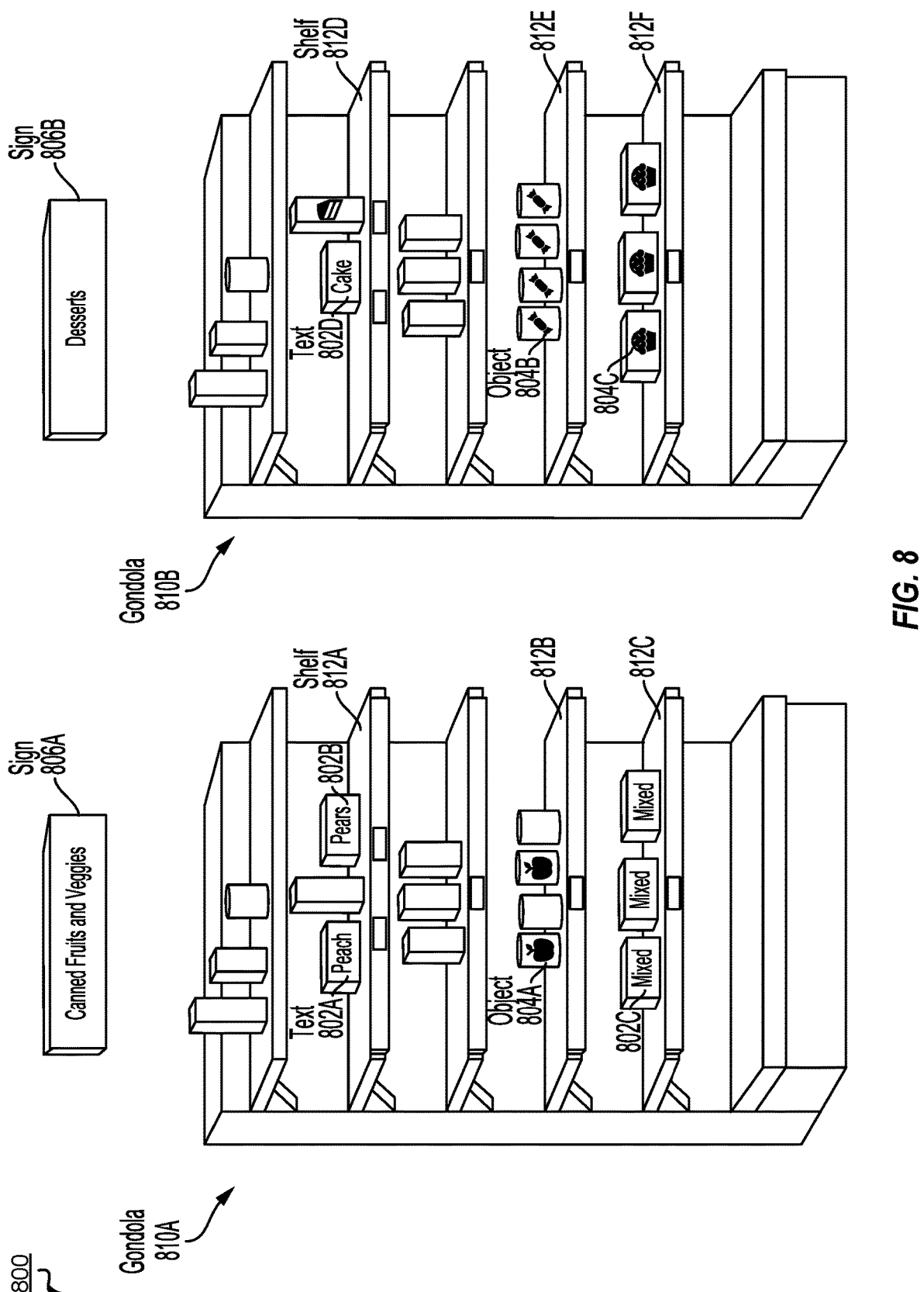
FIG. 8 is a perspective view of a portion of a retail location with ESL devices and assets for which wireless communications system-based positioning is converted to positional descriptions with respect to descriptional layouts of assets according to one or more aspects of this disclosure.

An illustrative example of the above-described process for converting wireless communications system-based positions to descriptions of the positions is now described with reference to FIG. 8. FIG. 8 is a perspective view of a portion of a retail location 800 with assets for which wireless communications system-based positioning is converted to positional descriptions with respect to descriptional layouts of assets according to one or more aspects of this disclosure. The perspective view shown in FIG. 8 may correspond to one or more frames of the survey video 528. In this example, the retail location 800 includes multiple gondolas 810A-810B that each include multiple shelves 812A-812C and 812D-812F, respectively, at different vertical levels from a floor. ESL devices may be attached to the shelves to display information regarding products stocked on various shelves in the vicinity of the ESL devices. Various products are positioned on the shelves of gondolas 810A-810B, which in this example are located in the same aisle, such as aisle 8. For example, with respect to gondola 810A, peaches and pears are positioned on shelf 812A, apples are positioned on shelf 812B, and mixed fruit is positioned on shelf 812C. In this example, with respect to gondola 810B, cake is positioned on shelf 812D, candy is positioned on shelf 812E, and muffins are positioned on shelf 812F.

As described above, network entity 520 may obtain position information 506 that indicates a position of UE 501, and position information 506 may be used to determine estimated position 526. In this example, the frame of video that displays the view shown in FIG. 8 is associated with position data that is the same as estimated position 526 (or is close before or after in time to such a frame). Based on the match between positions of estimated position 526 and the frame of survey video 528, network entity 520 may perform text recognition on the frame to detect text of labels of products, such as text 802A ("Peach"), text 802B ("Pears"), text 802C ("Mixed"), and text 802D ("Cake"). Network entity 520 may also perform object detection on the frame to detect one or more objects, such as object 804A (an apple), object 804B (candy), and object 806C (a muffin). Network entity 520 may extract the set of features 530 from the frame, and the set of features 530 may include text 802A-802D, shapes of objects 804A-804C, geometries of objects 804A-804C, sizes of text 802A-802D and objects 804A-804C, colors of text 802A-802D and objects 804A-804C, spatial or directional features (e.g., object 804B above text 802C, text 802A to the left of text 802B, object 804B relatively near object 804C, etc.), other features, or a combination thereof.

After extracting set of features 530, network entity 520 may use LLM manager 544 to generate and provide prompts to an LLM to generate descriptions of the extracted features to compare to descriptions of descriptional layout 532. For example, the LLM may generate a text output associated with peaches that includes the text "a box of peaches is left of a box of pears, and the box of peaches is above a can of applesauce." Based on this description, network entity 520 may identify, in the descriptional layout 532, the description "peaches are on gondola 1 in aisle 8 (the fruit and dessert aisle), on shelf 2, to the left of pears." This description may be the description stored in the descriptional layout 532 or may be the output of the LLM after providing as input a prompt based on the description from the descriptional layout 532, and this description may be provided as description 550 to UE 501. As another example, the LLM may generate a text output associated with muffins that includes the text "multiple rectangles with images of muffins are below jars with images of a candy." Based on this description, network entity 520 may identify, in the descriptional layout 532 (or using the description as a basis for an input prompt to the LLM to generate an output), the description "shelf 5 of gondola 2 in aisle 8 (the fruit and dessert aisle) contains muffins and muffin mix." This description may be provided to UE 501 to be displayed to the user. In this manner, wireless communications system-based positions may be converted to descriptions of positions with reference to descriptional layout 532, which may have greater utility to a user who is navigating the store in search of one or more products.

Returning to FIG. 5, in some implementations, additional positioning determinations may be performed using information from signs in the frames of video and the location. In such implementations, features related to the signs may be extracted, and descriptions of estimated positions may be related to the signs. For example, if the identified frames of the survey video 528 include a sign, the set of features 530 may include sign-based features such as text of the sign, a description of the sign, a shape of the sign, a geometry of the sign, a color of the sign, a color of the text, directional or spatial features of the sign (e.g., relative to other signs or assets), other sign-based features, or a combination thereof. Additionally, or alternatively, descriptional layout 532 may include a field of one or more entries that indicates a nearest sign, which may be a label displayed by ESL devices 591 or ESL tags 593, an aisle sign, a gondola sign, or another type of sign. Also, description 550 may be with reference to the signs within the location. Similar to as described above, sign-based features, descriptions related to the signs, or questions that include sign-based information may be used to generate prompts by LLM manager 544 to be provided to the LLM to generate descriptions of estimated positions with respect to the signs. In some implementations, prior to performing pattern matching on descriptions of the descriptional layout 532, network entity 520 may filter at least one description from the descriptional layout 532 based on the sign-based features. For example, if a sign for Aisle 6 is detected within the one or more frames, and corresponding features are extracted, network entity 520 may limit the pattern matching to only descriptions in descriptional layout 532 that correspond to Aisle 6. Additional details of a pipeline configured to perform at least some of the above-described operations with reference to signs is further described herein with reference to FIG. 7.

In some implementations, network entity 520 may be configured to determine position only with respect to signs throughout the location. In such implementations, network entity 520 may obtain an image or a video frame of a current position of UE 501 (instead of position information 506) and perform object detection on the image or video frame to detect a sign within the image or video frame. In such implementations, network entity 520 may extract a set of sign-based features from a portion of the image that includes the sign, such as text of the sign, color of the sign, shape of the sign, etc., and network entity 520 may perform pattern matching between the sign-based features and a descriptional sign layout. In such an example, network entity 520 may output a description of the current position of UE 501 with respect to signs described in the descriptional sign layout. For example, in such an example, description 550 may include "You are located in Aisle 2, fresh produce, which is between Aisle 1 (deli) and Aisle 3 (beverages)." Additional details of a pipeline configured to perform at least some of the above-described operations with reference to signs is further described herein with reference to FIG. 7.

In some implementations, network entity 520 may use the ability to convert between wireless communications system-based positioning and textual descriptions of positions with respect to descriptional layout 532 to provide additional or advanced features such as reverse lookups or descriptional directions. In some implementations that support reverse lookup functionality, network entity 520 is configured to maintain position information database 534 to store information relating position data (e.g., estimated/calculated position coordinates) and textual descriptions with reference to descriptional layout 532. In such implementations, after outputting description 550, network entity 520 may store description 550 and estimated position 526 in position information database 534 for later use. If a user of UE 501 or a user of the wireless communications system 500 wishes to know the positional coordinates of a selected product, network entity 520 may receive a reverse lookup request that includes a description of a requested product's position. Responsive to receiving the reverse lookup request, network entity 520 may access position information database 534 to identify position data associated with the description of the requested position. The accessed position information may be output by network entity 520 as position data to the user of or to UE 501 for display to the user of UE 501.

In some implementations that support descriptional direction functionality, network entity 520 is configured to retrieve queries that indicate descriptions of requested products for use in performing pattern matching to descriptional layout 532, and the matching descriptions from descriptional layout 532 are used to generate directions between UE 501 and the requested product. To illustrate, network entity 520 may receive a query 552 from UE 501. Query 552 may include or indicate a requested product (e.g., asset). Network entity 520 may identify a matching description in descriptional layout 532 by performing pattern matching based on query 552, and description 550 and the matching description (e.g., to query 552) may be compared to determine a description 554 of directions from estimated position 526 to a position of the requested item. For example, if description 550 indicates Aisle 8, and the matching description to query 552 indicates that the requested product is in Aisle 4, on the left side of shelf 3 of gondola 3, description 554 may include the text "Proceed four aisles down to Aisle for, your requested item is halfway down the aisle on the right, on the third shelf of gondola 3."

As described above with reference to FIG. 5, the wireless communications system 500 enabling conversion of wireless communications system-based positioning to more asset-relative positioning, such as descriptions of positions relative to the descriptional layout 532. For example, network entity 520 may generate description 550 based on position information 506 that provides description of a current location of UE 501 in a more meaningful way than providing position coordinates within a store or other location, without reference to the assets and their positions. As such, the wireless communications system 500 leverages wireless communications-based positioning operations (e.g., position information 506) and information used to keep track of assets, such as the descriptional layout 532 (e.g., a planogram or product information database) to generate positional descriptions (e.g., description 550) that have increased utility to a user without requiring additional positioning operations using a different coordinate system or other frame of reference. Stated another way, this positioning conversion makes use of a coordinate system derived from the survey video 528 (e.g., using a SFM approach) and maps each frames (and by transitivity each feature in the frame) into a coordinate system associated with the assets. The features may be extracted and categorized by associating them with unique descriptors, such as aisle, gondola, and shelf locations, and/or relative locations to other objects (e.g., "to the left of the spaghetti sauce"). This enables expression of position in terms that are associated with the extracted features (e.g., names of products at the position, names of areas in vicinity of the position, etc.) instead of referring to positional coordinates. Such positional descriptions may be more useful to a user and reduce time in orienting themselves with respect to assets that are stored at a location, such as a store or warehouse, than conventional position coordinates. Additionally, converting the position information 506 to more description-based positioning (e.g., the description 550) provides information that supports a reverse lookup or search—i.e., from features to coordinates. The conversion between positioning systems also enables generation of organizational-based, asset-based, or sign-based directions (e.g., description 554) that have greater utility to the user than coordinate-based directions. For example, a shopper in a store may query for directions to bread, and the network entity 520 may provide description 554 which includes directions to a queried product in retail semantics, such as a particular aisle and shelf location, as well as a distance in aisles from a current location. Such directions may reduce the user's time spent looking for assets, as compared to knowing their positional coordinates with respect to the store but not with respect to the arrangement of the assets. Similar descriptions can be provided based on signs within the location, thereby providing the user with simple directions that can be easily verified by examining nearby signs or information displayed on the ESL devices 591 or the ESL tags 593. The above-described functionality may be particularly beneficial in ESL applications due to enabling conversion of ESL-based positioning to more descriptive positioning that leverages the positioning framework provided by ESL systems.

Figure 6:
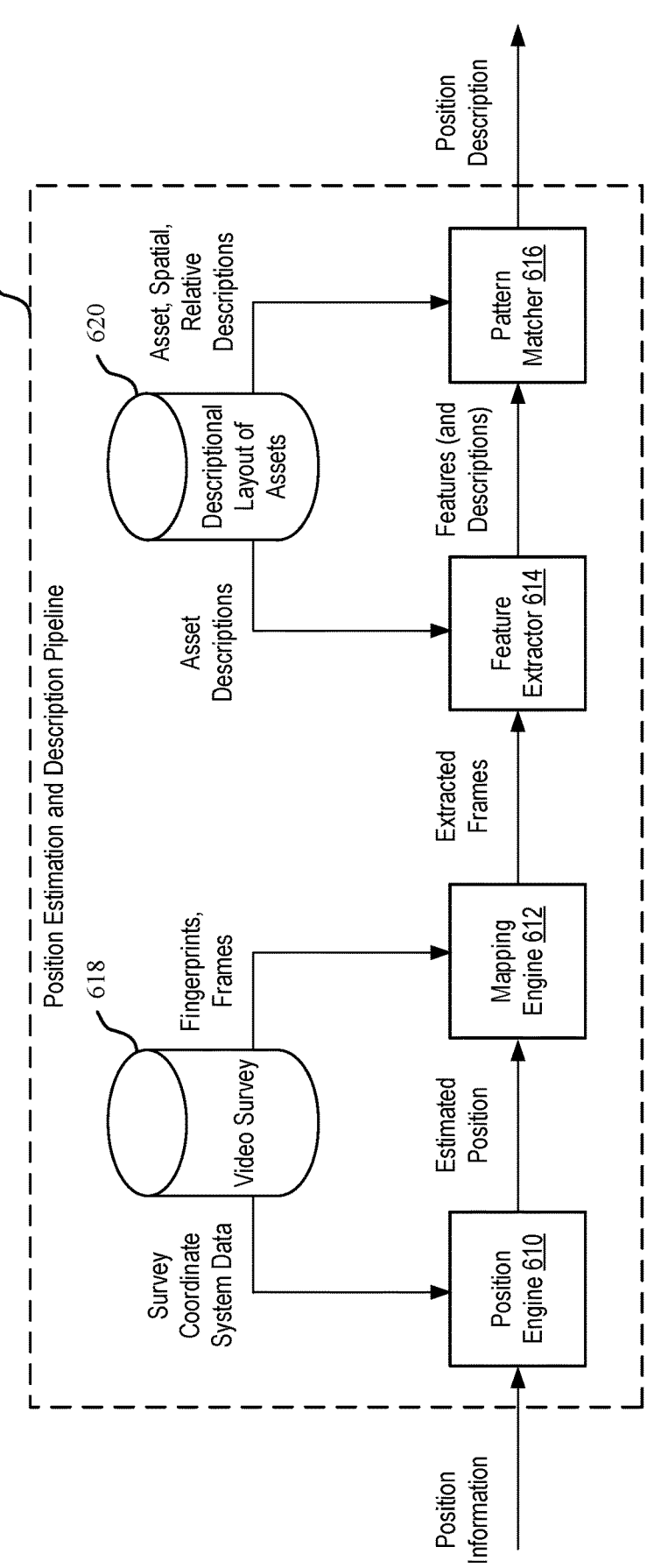
FIG. 6 is a block diagram illustrating an example position estimation and description pipeline according to one or more aspects of this disclosure.

FIG. 6 is a block diagram illustrating an example position estimation and description pipeline 600 according to one or more aspects of this disclosure. The position estimation and description pipeline 600 may be included or integrated in an ESL device, such as ESL device 108A of FIGS. 1A, 2B, and 4, or a network entity, such as network entity 520 of FIG. 5. In the example shown in FIG. 6, position estimation and description pipeline 600 includes a position engine 610, a mapping engine 612 coupled to position engine 610, a feature extractor 614 coupled to mapping engine 612, and a pattern matcher 616 coupled to feature extractor 614. Additionally, position estimation and description pipeline 600 may access a video survey 618 and a descriptional layout 620 of assets, similar to survey video 528 and descriptional layout 532 of FIG. 5. In aspects described herein, a survey process of a location is video-based, resulting in ephemeris that provide calculated positions (e.g., camera poses) associated with video frames of video survey 618. Additionally, similar to as described above, descriptional layout 620 provides a reference product organization. For example, descriptional layout 620 may include a planogram or database that provides information about organization of products through typical retail semantics such as aisle, gondola, unit, shelves, etc.

During operation of position estimation and description pipeline 600, position engine 610 receives position information and generates an estimated position based on the position information. For example, the position information may include or correspond to RF fingerprints (e.g., signal measurements), sensor readings, and other forms of wireless communications system-based positioning or external system-based positioning, and the estimated position comprises positional coordinates, such as x, y, z coordinates, in a coordinate system of the location (e.g., a store, a warehouse, etc.) that was used to perform the video survey. Such a coordinate system may also be referred to as a survey coordinate system. Mapping engine 612 may receive the estimated position and extract one or more frames from video survey 618 based on the estimated position. To illustrate, mapping engine 612 may use the surveyed ephemeris (e.g., video survey 618) to extracts images associated with the current (or within a time window) estimated position by position engine 610. For example, the extracted frames may be associated with RF fingerprints (or other wireless communications system-based positioning data) that matches the estimated position output by position engine 610.

Feature extractor 614 may extracts relevant features from the ephemeris (e.g., the extracted frames) and reference product organization (e.g. descriptional layout 620). Stated another way, feature extractor 614 may automatically derive the vocabulary of products or other assets from the extracted video frames and may detect/identify objects from the extracted frames and from the planogram (e.g., objects described in descriptional layout 620). In some implementations, the extracted features may be furnished with associated descriptors such as geometric descriptions like shape, spatial descriptions, text descriptions, size descriptions, color descriptions, etc. Additionally, or alternatively, feature extractor 614 may extract features that are similar to features/descriptions included in descriptional layout 620, to enable more accurate pattern matching, as shown in FIG. 6 by feature extractor 614 receiving asset descriptions from descriptional layout 620. These asset descriptions may be used in identifying features for extraction or in generating descriptions of extracted features that have a similar vocabulary to the descriptions in descriptional layout 620. Pattern matcher 616 may match the received features (and descriptions) to descriptions in descriptional layout 620 to identify one or more descriptions to be output by position estimation and description pipeline 600 as a position description (e.g., a description of an estimated position of a UE). To illustrate, pattern matcher 616 may identify and match patterns between the extracted features (and descriptions) and reference product organization descriptions, such as asset, spatial, scale invariant, and relative descriptions. As such, pattern matcher 616 may perform pattern matching between the objects in retail store images (e.g., based on the extracted features) to the objects in planogram (e.g., descriptions in descriptional layout 620). This pattern matching may be at different levels. For example, pattern matching may be performed at a unit level, at a shelf level, at an aisle level, or the like, depending on complexity of descriptional layout 620 and processing capabilities of the network entity. The description that matches, or is most similar to, the extracted features may be output as the position description which may be in terms of retail semantics: aisle-gondola-unit-shelf-products, as a non-limiting example. In some implementations, as described above with reference to FIG. 5, custom machine learning (ML) models or LLMs may be used for feature extraction and description and/or for pattern matching with descriptional layout 620.

Figure 7:
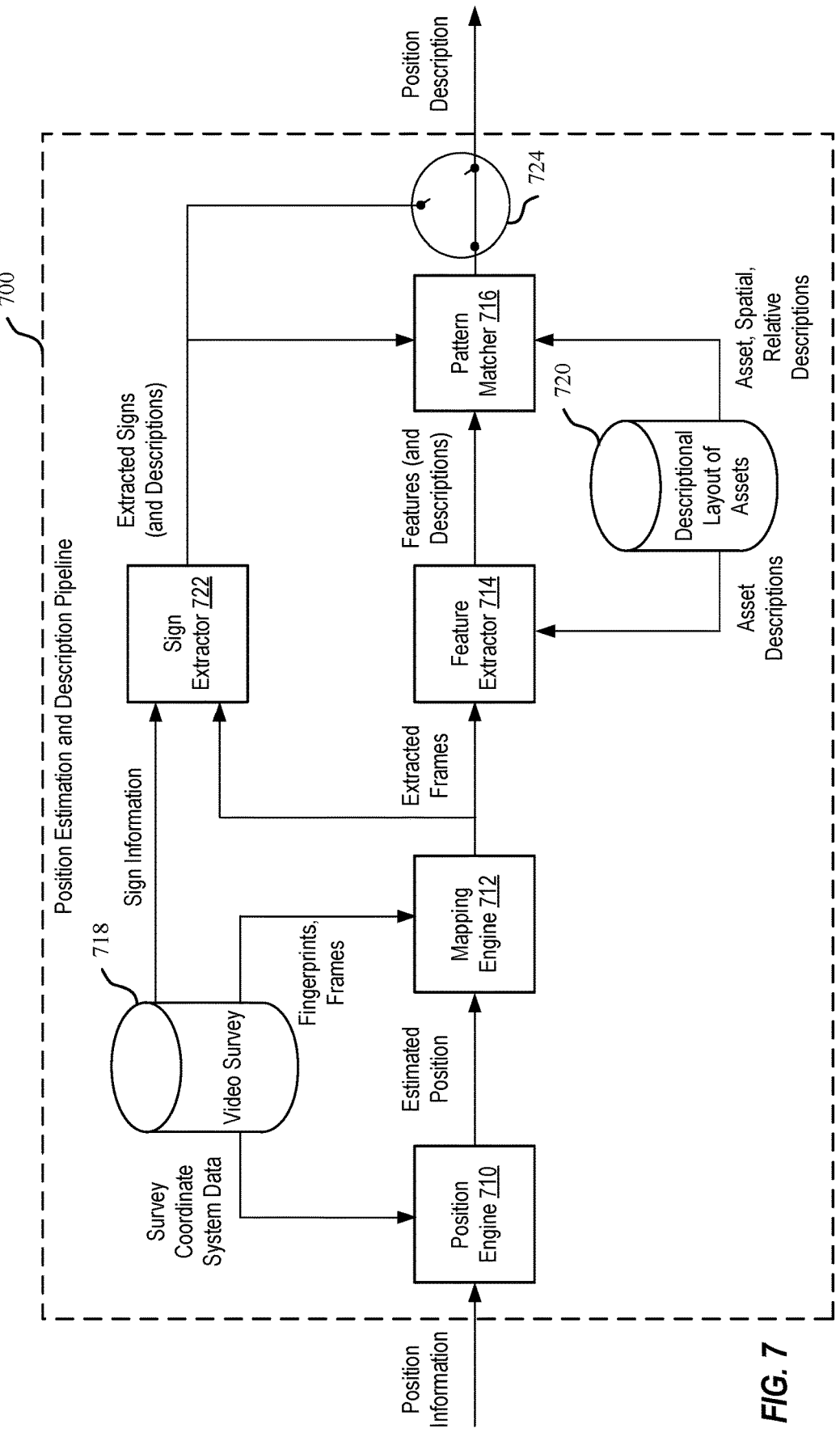
FIG. 7 is a block diagram illustrating an example position estimation and description pipeline according to one or more aspects of this disclosure.

FIG. 7 is a block diagram illustrating an example position estimation and description pipeline 700 according to one or more aspects of this disclosure. The position estimation and description pipeline 700 may be included or integrated in an ESL device, such as ESL device 108A of FIGS. 1A, 2B, and 4, or a network entity, such as network entity 520 of FIG. 5. In the example shown in FIG. 7, the position estimation and description pipeline 700 includes position engine 710, mapping engine 712, feature extractor 714, pattern matcher 716, video survey 718, and descriptional layout 720, similar to position engine 610, mapping engine 612, feature extractor 614, pattern matcher 616, video survey 618, and descriptional layout 620, respectively. Position estimation and description pipeline 700 also includes sign extractor 722 coupled to mapping engine 712, and switch 724 coupled to pattern matcher 716 and sign extractor 722.

Retail stores typically include signs showing information related to what products are located on aisles, gondolas, shelves, or the like, and signs signifying item categories such as milk, baking, produce, dessert, beverages, chips, etc. Ephemeris generated via video survey 718 can be extended, as compared to the ephemeris described with reference to FIG. 6, by overlaying sign information (e.g., sign identification and product association) to each surveyed position (e.g., each frame of video survey 718). To leverage this sign information, sign extractor 722 may scan, identify and associate signs captured by the video capture device (e.g., camera) during the survey and included in the extracted video frames, similar to extracting features related to other detected objects. These sign-based features may include text of one or more signs in the one or more frames, descriptions of the one or more signs, or a combination thereof. In some implementations, sign extractor 722 may leverage a custom ML model or an LLM to generate descriptions of the signs or otherwise perform the sign extraction. The extracted signs (and corresponding descriptions) may be provided to pattern matcher 716 for use in performing the pattern matching to descriptional layout 720 and the extracted signs can be provided to switch 724. Switch 724 thus provides two possibilities: first, switch 724 may output a description that matches the extracted features and the extracted signs, similar to the description described above with reference to FIG. 6; or second, switch 724 may output the extracted signs (and corresponding descriptions). The switch 724 may be operated based on user input (e.g., user selection of asset and sign-based description or exclusively sign-based description), based on one or more preprogrammed settings or parameters, or otherwise configured to select between outputting a description that takes is with respect to assets and signs or is only with respect to signs. If the first option is selected, the sign information may be used to reduce a search space while performing pattern matching, thus making the solution optimal and robust. For example, one or more descriptions in the descriptional layout 720 may be filtered out if they are associated with signs that do not match the extracted signs. In this case, the estimated position is expressed in terms of retail semantics for both products and signs, such as aisle numbers, gondola numbers, unit numbers, shelf numbers, product types, or a combination thereof. If the second option is selected, the estimated position (e.g., x, y, z coordinates) is converted to position that is expressed relative to signs. This removes the dependency on reference product organization (e.g., descriptional layout 720) but the position granularity is dependent on sign density and granularity at the location. For example, if only aisles and product types are labeled in signs, such a description may only be in terms of aisle number and product type, not gondola number, shelf number, or direction from other assets.

Illustrative examples are now described with reference again to FIG. 8. In the example shown in FIG. 8, the frame(s) of video include signs 806A-806B that correspond to gondolas 810A-810B, respectively. Sign 806A indicates "Canned Fruits" and sign 806B indicates "Desserts". Although gondola-related signs are shown in FIG. 8, in other examples, signs may provide information related to aisles, shelves, or other units. Sign extractor 722 may identify sign 806A and sign 806B, similar to as described above for detecting text 802A-802D or objects 804A-804C. Descriptions of estimated positions may further include sign information or product type information. For example, based on pattern matching using the extracted features and the extracted signs, pattern matcher 716 may identify, in the descriptional layout 720, the description "peaches are on with canned fruits and veggies on gondola 1 in aisle 8 (the fruit and dessert aisle), on shelf 2, to the left of pears." As another example, based on pattern matching using the extracted features and the extracted signs, pattern matcher 716 may identify, in the descriptional layout 720 "shelf 5 of gondola 2 in aisle 8 (the fruit and dessert aisle) contains muffins and muffin mix, below shelves containing other desserts." These descriptions may provide a user who is navigating the store in search of one or more products with more detailed information and thus reduce the time they spend searching for the products.

If the second option of switch 724 is selected, position estimation and description pipeline 700 may output descriptions of position based only on signs (and not on products). For example, instead of extracting video frames from video survey 718, sign extractor 722 may receive as input an image or video frame captured at a UE's current position. The sign extractor 722 may extract a sign included in the image or frame to provide direct estimation of UE position in retail semantics through sign detection/identification. However, such position granularity depends on level and density of signs in the retail environment. For example, the position may be described in terms of aisle signs, gondola signs, shelf signs, individual item signs, product type signs, or the like, depending on the granularity of signs that are placed about the location. Such an implementation could eliminate the need for a survey to be performed, if an entity that manages the location is willing to allow images or video to be captured at the location and shared between devices.

Figures 9, 10:
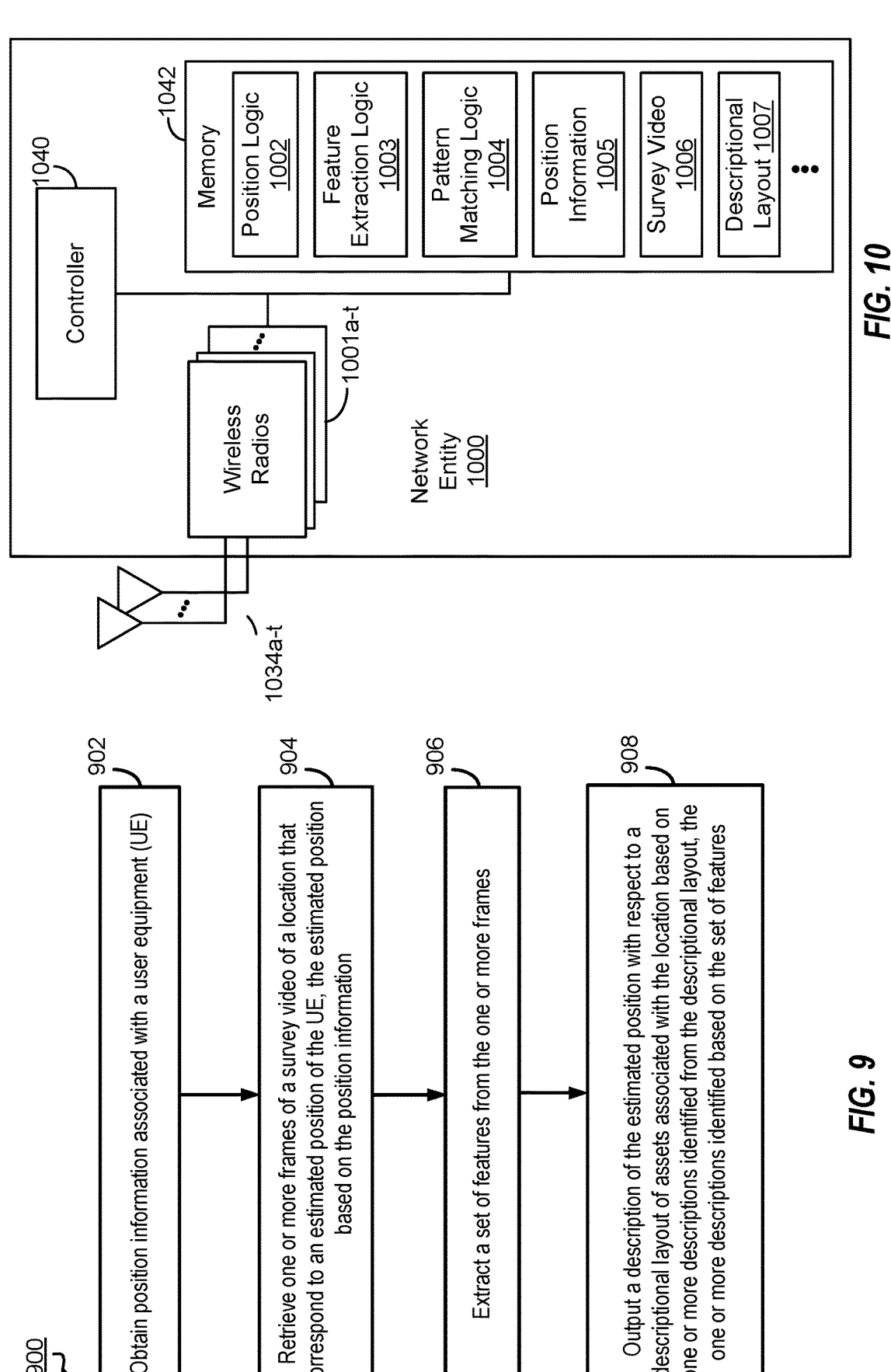
FIG. 9 is a flow diagram illustrating an example process that supports conversion of wireless communications system-based positioning to positional descriptions with respect to descriptional layouts of assets according to one or more aspects of this disclosure.
FIG. 10 is a block diagram of an example ESL device that supports conversion of wireless communications system-based positioning to positional descriptions with respect to descriptional layouts of assets according to one or more aspects of this disclosure.

FIG. 9 is a flow diagram illustrating an example process 900 that supports conversion of wireless communications system-based positioning to positional descriptions with respect to descriptional layouts of assets according to some embodiments of the disclosure. The operations of the process 900 may be performed by a network entity (or its components) or an ESL device (or its components) as described herein. For example, the process 900 may be performed by network entity 520 described above with reference to FIG. 5 or a network entity 1000 as described with reference to FIG. 10.

At block 902, a network entity obtains position information associated with a UE. For example, the position information may include or correspond to position information 506 of FIG. 5. At block 904, the network entity retrieves one or more frames of a survey video of a location that correspond to an estimated position of the UE. The estimated position is based on the position information. For example, the estimated position may include or correspond to estimated position 526 of FIG. 5, and the survey video may include or correspond to survey video 528 of FIG. 5.

At block 906, the network entity extracts a set of features from the one or more frames. For example, the set of features may include or correspond to set of features 530 of FIG. 5. At block 908, the network entity outputs a description of the estimated position with respect to a descriptional layout of assets associated with the location based on one or more descriptions identified from the descriptional layout. The one or more descriptions are identified based on the set of features. For example, the descriptional layout may include or correspond to descriptional layout 532 of FIG. 5, and the description of the estimated position may include or correspond to description 550 of FIG. 5. In some implementations, the description of the estimated position is relative to one or more of the assets. Additionally or alternatively, the description of the estimated position may include an aisle label, a gondola label, a shelf label, or a combination thereof. Additionally or alternatively, the descriptional layout may include names, descriptions, and locations of products in retail semantics. Additionally or alternatively, the descriptional layout may represent a planogram of a store and/or include descriptions of spatial relationships between at least some of the products.

In some implementations, process 900 further includes mapping the position information to the estimated position of the UE within the location. For example, the mapping may be performed by position mapper 542 of FIG. 5. Additionally or alternatively, obtaining the position information may include calculating one or more of a RSSI, a RSRP, or an AoA of one or more beacon responses from one or more of the assets and a beacon response from the UE, and determining the position information based on one or more of the RSSI, the RSRP, or the AoA of the one or more beacon responses and the beacon response. In some such implementations, the one or more of the assets may correspond to one or more radio frequency identification (RFID) tags for one or more products that are capable of transmitting beacon response messages within an ESL system. For example, the one or more RFID tags may include or correspond to ESL tags 593 of FIG. 5.

In some implementations, the survey video includes a plurality of frames captured by a video capture device while navigating throughout the location. In some such implementations, each of the plurality of frames are associated with position coordinates, ephemeris data, or both, at which the respective frame is captured, and the position information associated with the UE includes position coordinates associated with the UE, ephemeris data associated with the UE, or both. For example, a store employee may walk around the store capturing video of assets on the shelves or CCTV cameras may capture video of the store, and each frame of video may be tagged with position coordinates of the video capture device when each frame of video is captured. Additionally or alternatively, ephemeris may be generated that is associated with particular times, and the ephemeris may be mapped to position by mapping the time of the ephemeris to time at which the video is captured.

In some implementations, the device is an ESL controller that is associated with a plurality of ESLs, and each ESL of the plurality of ESLs is associated with one or more tags corresponding to one or more of the assets. For example, the device may correspond to the network entity 520 of FIG. 5 (e.g., an ESL controller) that is associated with the ESL tags 593 of FIG. 5. Alternatively, the device may be an edge or cloud server that is associated with a plurality of ESL access points (APs). For example, the device may correspond to the network entity 520 of FIG. 5 (e.g., an edge or cloud server) that is associated with the ESL devices 591 (e.g., ESL APs) of FIG. 5. Alternatively, the device may be a network entity, such as a base station or other network entity that is not part of an ESL system.

In some implementations, the process 900 further includes performing object detection on the one or more frames to detect one or more objects within the one or more frames, and at least a portion of the set of features corresponds to the one or more objects. For example, the network entity 520 of FIG. 5 may perform one or more object detection operations on survey video 528 of FIG. 5 to detect objects, such as products or signs, that are associated with the set of features 530. Additionally or alternatively, the set of features may include products identified in the one or more frames, text of signs in the one or more frames, directional features with respect to one or more detected objects in the one or more frames, geometric descriptions of the one or more frames, spatial descriptions of the one or more frames, text descriptions of the one or more frames, or a combination thereof.

In some implementations, the process 900 also includes providing one or more prompts based on at least one of the set of features to an AI LLM to generate one or more other features of the set of features. For example, the LLM manager 544 of FIG. 5 may generate one or more prompts based on at least some of the extracted features, and the one or more prompts may be provided as input by the LLM manager 544 to an LLM to generate textual descriptions of information that corresponds to some of the features, or to generate more natural, user-friendly textual descriptions. Additionally or alternatively, the process 900 may include providing one or more prompts based on at least one of the one or more descriptions to an AI LLM to generate the description of the estimated position. For example, the LLM manager 544 of FIG. 5 may generate one or more prompts based on a description from the descriptional layout 532, and the one or more prompts may be provided as input by the LLM manager 544 to an LLM to generate more natural, user-friendly textual descriptions that are output as description 550.

In some implementations, the process 900 further includes performing pattern matching between the set of features and the descriptional layout to identify the one or more descriptions that most closely match the set of features. For example, the set of features 530 of FIG. 5, or textual descriptions thereof, may be compared to descriptions included in the descriptional layout 532 to identify which of the descriptions is most similar to the features/descriptions of the features, such as based on a similarity score or another metric. Additionally or alternatively, the process 900 may include transmitting the description of the estimated position to the UE. For example, the network entity 520 of FIG. 5 may transmit description 550 to the UE 501.

In some implementations, the set of features further includes sign-based features that include text of one or more signs in the one or more frames, descriptions of the one or more signs, or a combination thereof. In some such implementations, the process 900 may also include providing one or more prompts based on at least one of the sign-based features to an AI LLM to generate at least one of the descriptions of the one or more signs. For example, the LLM manager 544 of FIG. 5 may generate one or more prompts based on at least some of the sign-based features, and the one or more prompts may be provided as input by the LLM manager 544 to an LLM to generate textual descriptions of information that corresponds to the signs, or to generate more natural, user-friendly textual descriptions of the signs. Additionally or alternatively, the process 900 may further include, prior to identifying the one or more descriptions, filtering at least one description from the descriptional layout based on the sign-based features. For example, when performing the pattern matching, the network entity 520 of FIG. 5 may filter out descriptions from the descriptional layout 532 that do not match areas related to signs detected in the frames of the survey video 528. In some such implementations, the description of the estimated position is with reference to signs within the location. For example, the description 550 of FIG. 5 may describe a position in terms of labeled aisles, labeled shelves, or the like.

In some implementations, the process 900 also includes storing the description of the estimated position and the estimated position in a position information database. The position information database may be configured to store descriptions of positions and associated position data. For example, the position information database may include or correspond to position information database 534 of FIG. 5. In some such implementations, the process 900 may further include receiving a reverse lookup request that includes a description of a requested position, accessing the position information database to identify position data associated with the description of the requested position, and outputting the identified position data. For example, the network entity 520 of FIG. 5 may access the position information database 534 based on a requested position for which a description is received from UE 501 in order to identify a position, such as in cartesian coordinates for the location, of the requested described position.

In some implementations, the process 900 further includes obtaining an image of a current position of the UE, performing object detection on the image to detect a sign within the image, extracting a second set of features from a portion of the image that includes the sign, and outputting a description of the current position with respect to a plurality of signs described in the descriptional layout. The description of the current position is based on descriptions of one or more of the plurality of signs identified from the descriptional layout based on the second set of features. For example, some implementations may perform sign-based positioning, as further described above with reference to FIG. 7.

In some implementations, the process 900 also includes receiving a query from the UE which includes a requested item, determining directions from the estimated position to a position of the requested item, determining a description of the directions based on the descriptional layout, and outputting the description of the directions to the UE. For example, the query may include or correspond to the query 552 of FIG. 5, and the description of the directions may include or correspond to description 554 of FIG. 5.

FIG. 10 is a block diagram of an example network entity that supports conversion of wireless communications system-based positioning to positional descriptions with respect to descriptional layouts of assets according to one or more aspects of this disclosure. The network entity 1000 may be configured to perform operations, including the blocks of process 900 described with reference to FIG. 9. In some implementations, the network entity 1000 includes the structure, hardware, and components shown and described with reference to the network entity 520 of FIG. 5. For example, the network entity 1000 may include the controller 1040, which operates to execute logic or computer instructions stored in the memory 1042, as well as controlling the components of the network entity 1000 that provide the features and functionality of the network entity 1000. The network entity 1000, under control of the controller 1040, transmits and receives signals via the wireless radios 1001*a-t* and the antennas 1034*a-t*. The wireless radios 1001*a-t* include various components and hardware, such as modulators and demodulators, a multiple input, a multiple output (MIMO) detector, a receive processor, a transmit processor, a transmit (TX) MIMO processor, a receive (RX) MIMO processor, a Bluetooth receiver, a Bluetooth transmitter, a PAN receiver, a PAN transmitter, other wireless radio components, or a combination thereof.

As shown, the memory 1042 may include (or be configured to store) position logic 1002, feature extraction logic 1003, pattern matching logic 1004, position information 1005, survey video 1006, and descriptional layout 1007. The position logic 1002 may be configured to perform wireless communications system-based positioning operations to generate the position information 1005. The feature extraction logic 1003 may be configured to extract one or more features from frames of the survey video 1006. The pattern matching logic 1004 may be configured to match descriptions of the extracted features to descriptions in the descriptional layout 1007. The position information 1005 may include or correspond to the position information 506 of FIG. 5. The survey video 1006 may include or correspond to the survey video 528 of FIG. 5. The descriptional layout 1007 may include or correspond to the descriptional layout 532 of FIG. 5. The memory 1042 may also include (or be configured to store) communication logic that is configured to enable communication between the network entity 1000 and one or more other devices. The network entity 1000 may receive signals from or transmit signals to one or more UEs, such as the UE 501 of FIG. 5 or a UE 1200 as described with reference to FIG. 12.

Figures 11, 12:
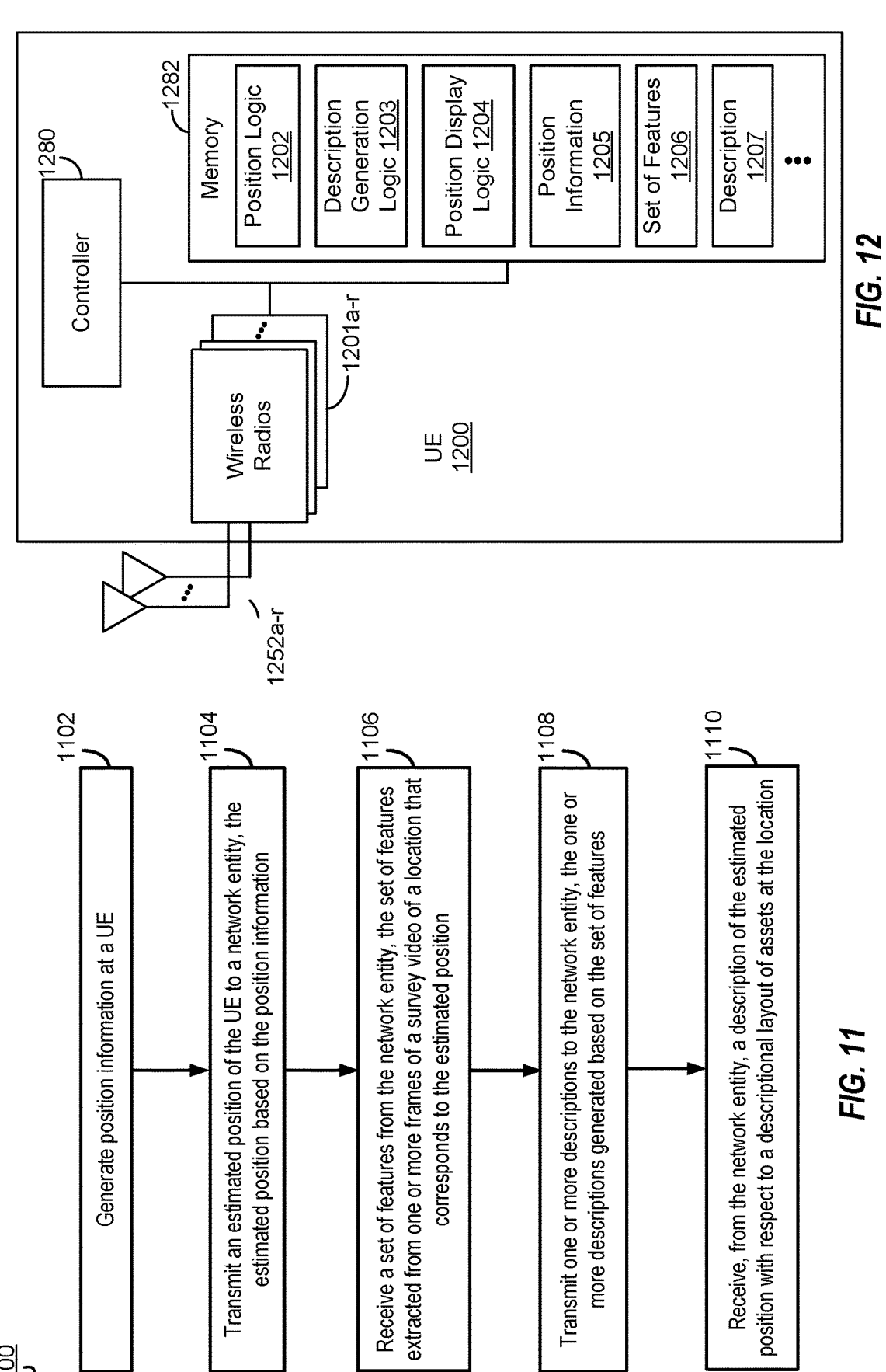
FIG. 11 is a flow diagram illustrating an example process that supports conversion of wireless communications system-based positioning to positional descriptions with respect to descriptional layouts of assets according to one or more aspects of this disclosure.
FIG. 12 is a block diagram of an example user equipment (UE) that supports conversion of wireless communications system-based positioning to positional descriptions with respect to descriptional layouts of assets according to one or more aspects of this disclosure.

FIG. 11 is a flow diagram illustrating an example process 1100 that supports conversion of wireless communications system-based positioning to positional descriptions with respect to descriptional layouts of assets according to some embodiments of the disclosure. The operations of the process 1100 may be performed by a UE or its components as described herein. For example, the process 1100 may be performed by UE 501 described above with reference to FIG. 5 or a UE 1200 as described with reference to FIG. 12.

At block 1102, a UE generates position information. For example, the position information may include or correspond to position information 506 of FIG. 5. At block 1104, the UE transmits an estimated position of the UE to a network entity. The estimated position is based on the position information. For example, the estimated position may include or correspond to estimated position 526 of FIG. 5.

At block 1106, the UE receives a set of features from the network entity. The set of features is extracted from one or more frames of a survey video of a location corresponds to the estimated position. For example, the set of features may include or correspond to the set of features 530 of FIG. 5. At block 1108, the UE transmits one or more descriptions to the network entity. The one or more descriptions are generated based on the set of features. For example, the one or more descriptions may be similar to the one or more descriptions generated by LLM manager 544 of FIG. 5. At block 1110, the UE receives, from the network entity, a description of the estimated position with respect to a descriptional layout of assets associated with the location. For example, the description may include or correspond to description 550 of FIG. 5. In some implementation, the description of the estimated location may be relative to one or more of the assets or in "retail semantics," such as including an aisle label, a gondola label, a shelf label, or a combination thereof.

In some implementations, the UE may map the position information (e.g., one or more of a RSSI, a RSRP, or an AOA of one or more beacons or beacon responses) to the estimated position and transmit the estimated provision to the network entity. For example, the UE may map wireless communications system-based positioning information to an estimated position in a cartesian coordinate system that represents the location, similar to the position mapper 542 of FIG. 5. Additionally or alternatively, the UE provide one or more prompts based on the set of features to a LLM to generate the one or more descriptions. For example, the LLM may include or correspond to an LLM that is managed by LLM manager 544 of FIG. 5. In some such implementations, the set of features may include sign-based features, and the UE may provide one or more prompts based on the sign-based features to the LLM to generate the one or more descriptions.

In some implementations, the UE may receive a user input that includes a query for a requested item. The UE may transmit the query to the network entity as a request for directions. For example, the query may include or correspond to the query 552 of FIG. 5. In some such implementations, the UE may receive a description of directions to the requested item, and the UE may output the description of the directions to enable a user to navigate through the location to a requested asset. For example, the description of directions may include or correspond to description 554 of FIG. 5.

FIG. 12 is a block diagram of an example UE 1200 that supports conversion of wireless communications system-based positioning to positional descriptions with respect to descriptional layouts of assets according to one or more aspects of this disclosure. The UE 1200 may be configured to perform operations, including the blocks of the process 1100 described with reference to FIG. 11. In some implementations, the UE 1200 includes the structure, hardware, and components shown and described with reference to the UE 501 of FIG. 5. For example, the UE 1200 includes the controller 1280, which operates to execute logic or computer instructions stored in the memory 1282, as well as controlling the components of the UE 1200 that provide the features and functionality of the UE 1200. The UE 1200, under control of the controller 1280, transmits and receives signals via the wireless radios 1201a-r and the antennas 1252a-r. The wireless radios 1201a-r may include various components and hardware, such as modulators and demodulators, a multiple input, a MIMO detector, a receive processor, a transmit processor, a TX MIMO processor, an RX MIMO processor, a Bluetooth receiver, a Bluetooth transmitter, a PAN receiver, a PAN transmitter, other wireless radio components, or a combination thereof.

As shown, the memory 1282 may include (or be configured to store) position logic 1202, feature extraction logic 1203, pattern matching logic 1204, position information 1205, survey video 1206, and descriptional layout 1207. The position logic 1202 may be configured to perform wireless communications system-based positioning operations to generate the position information 1205. The feature extraction logic 1203 may be configured to extract one or more features from frames of the survey video 1206. The pattern matching logic 1204 may be configured to match descriptions of the extracted features to descriptions in the descriptional layout 1207. The position information 1205 may include or correspond to the position information 506 of FIG. 5. The survey video 1206 may include or correspond to the survey video 528 of FIG. 5. The descriptional layout 1207 may include or correspond to the descriptional layout 532 of FIG. 5. The memory 1282 may also include (or be configured to store) communication logic that is configured to enable communication between the UE 1200 and one or more other devices. The UE 1200 may receive signals from or transmit signals to one or more devices, such as the network entity 520 of FIG. 5 or the network entity 1000 of FIG. 10.

It is noted that one or more blocks (or operations) described with reference to FIGS. 1-12 may be combined with one or more blocks (or operations) described with reference to another of the figures. For example, one or more blocks (or operations) of FIG. 5 may be combined with one or more blocks (or operations) of FIGS. 1-4, 6, 7, and 9-12. As another example, one or more blocks associated with FIG. 9 may be combined with one or more blocks associated with FIG. 11. As another example, one or more blocks associated with FIG. 10 or 12 may be combined with one or more blocks associated with FIGS. 1-9 and 11.

In one or more aspects, techniques for supporting conversion of wireless communications system-based positioning to positional descriptions with respect to descriptional layouts may include additional aspects, such as any single aspect or any combination of aspects described below or in connection with one or more other processes or devices described elsewhere herein. In some examples, the techniques of one or more aspects may be implemented in a method or process. In some other examples, the techniques of one or more aspects may be implemented in a wireless communication device, such as a network entity or a component of a network entity, an ESL device or a component of an ESL device, an AP or a component of an AP, a gateway node or a component of a gateway node, a server or a component of a server, a UE or a component of a UE, a base station, a component of a base station, a server, a component of a server, another network entity, or a component of another network entity. In some examples, the wireless communication device may include at least one processor (which may include an application processor, a modem or other components) and at least one memory device coupled to the processor. The processor may be configured to perform operations described herein with respect to the wireless communication device. In some examples, the memory device includes a non-transitory, computer-readable medium storing instructions or having program code stored thereon that, when executed by the processor, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

Implementation examples are described in the following numbered clauses:

Clause 1: A device for wireless communication, the device including: at least one processor; and a memory coupled to the at least one processor, the at least one processor configured to cause the device to: obtain position information associated with a user equipment (UE); retrieve one or more frames of a survey video of a location that correspond to an estimated position of the UE, the estimated position based on the position information; extract a set of features from the one or more frames; and output a description of the estimated position with respect to a descriptional layout of assets associated with the location based on one or more descriptions identified from the descriptional layout, the one or more descriptions identified based on the set of features.

Clause 2: The device of clause 1, where the description of the estimated position is relative to one or more of the assets.

Clause 3: The device of clause 1, where the description of the estimated position includes an aisle label, a gondola label, a shelf label, or a combination thereof.

Clause 4: The device of clause 1, where the at least one processor is configured to further cause the device to: map the position information to the estimated position of the UE within the location.

Clause 5: The device of clause 1, where, to obtain the position information, the at least one processor is configured to cause the device to: calculate one or more of a received signal strength indicator (RSSI), a reference signal received power (RSRP), or an angle of arrival (AoA) of one or more beacon responses from one or more of the assets and a beacon response from the UE; and determine the position information based on one or more of the RSSI, the RSRP, or the AoA of the one or more beacon responses and the beacon response.

Clause 6: The device of clause 5, where the one or more of the assets correspond to one or more radio frequency identification (RFID) tags for one or more products within an electronic shelf label (ESL) system.

Clause 7: The device of clause 1, where the survey video includes a plurality of frames captured by a video capture device while navigating throughout the location.

Clause 8: The device of clause 7, where each of the plurality of frames are associated with position coordinates, ephemeris data, or both, at which the respective frame is captured, and where the position information associated with the UE includes position coordinates associated with the UE, ephemeris data associated with the UE, or both.

Clause 9: The device of clause 1, where the device is a network entity.

Clause 10: The device of clause 1, where the device is an edge or cloud server, and where the edge or cloud server is associated with a plurality of electronic shelf label (ESL) access points (APs) or a plurality of ESLs, each ESL of the plurality of ESLs associated with one or more tags corresponding to one or more of the assets.

Clause 11: A method of wireless communication, the method including: obtaining position information associated with a user equipment (UE); retrieving one or more frames of a survey video of a location that correspond to an estimated position of the UE, the estimated position based on the position information; extracting a set of features from the one or more frames; and outputting a description of the estimated position with respect to a descriptional layout of assets associated with at the location based on one or more descriptions identified from the descriptional layout, the one or more descriptions identified based on the set of features.

Clause 12: The method of clause 11, further including: performing object detection on the one or more frames to detect one or more objects within the one or more frames, where at least a portion of the set of features corresponds to the one or more objects.

Clause 13: The method of clause 11, where the set of features includes products identified in the one or more frames, text of signs in the one or more frames, directional features with respect to one or more detected objects in the one or more frames, geometric descriptions of the one or more frames, spatial descriptions of the one or more frames, text descriptions of the one or more frames, or a combination thereof.

Clause 14: The method of clause 11, further including: providing one or more prompts based on at least one of the set of features to an artificial intelligence (AI) large language model (LLM) to generate one or more other features of the set of features.

Clause 15: The method of clause 11, further including: performing pattern matching between the set of features and the descriptional layout to identify the one or more descriptions that most closely match the set of features.

Clause 16: The method of clause 11, further including: providing one or more prompts based on at least one of the one or more descriptions to an artificial intelligence (AI) large language model (LLM) to generate the description of the estimated position.

Clause 17: The method of clause 11, where the set of features further includes sign-based features, the sign-based features including text of one or more signs in the one or more frames, descriptions of the one or more signs, or a combination thereof.

Clause 18: The method of clause 17, further including: providing one or more prompts based on at least one of the sign-based features to an artificial intelligence (AI) large language model (LLM) to generate at least one of the descriptions of the one or more signs.

Clause 19: The method of clause 17, further including: prior to identifying the one or more descriptions, filtering at least one description from the descriptional layout based on the sign-based features.

Clause 20: The method of clause 17, where the description of the estimated position is with reference to signs within the location.

Clause 21: The method of clause 11, further including: transmitting the description of the estimated position to the UE.

Clause 22: A non-transitory, computer-readable medium storing instructions that, when executed by one or more processors, cause the one or more processors to perform operations including: obtaining position information associated with a user equipment (UE); retrieving one or more frames of a survey video of a location that correspond to an estimated position of the UE, the estimated position based on the position information; extracting a set of features from the one or more frames; and outputting a description of the estimated position with respect to a descriptional layout of assets associated with at the location based on one or more descriptions identified from the descriptional layout, the one or more descriptions identified based on the set of features.

Clause 23: The non-transitory, computer-readable medium of clause 22, where the operations further include: storing the description of the estimated position and the estimated position in a position information database, where the position information database is configured to store descriptions of positions and associated position data.

Clause 24: The non-transitory, computer-readable medium of clause 23, where the operations further include: receiving a reverse lookup request that includes a description of a requested position; accessing the position information database to identify position data associated with the description of the requested position; and outputting the identified position data.

Clause 25: The non-transitory, computer-readable medium of clause 22, where the operations further include: obtaining an image of a current position of the UE; performing object detection on the image to detect a sign within the image; extracting a second set of features from a portion of the image that includes the sign; and outputting a description of the current position with respect to a plurality of signs described in the descriptional layout, the description of the current position based on descriptions of one or more of the plurality of signs identified from the descriptional layout based on the second set of features.

Clause 26: The non-transitory, computer-readable medium of clause 22, where the operations further include: receiving a query from the UE, the query including a requested item; determining directions from the estimated position to a position of the requested item; determining a description of the directions based on the descriptional layout; and outputting the description of the directions to the UE.

Clause 27: An electronic shelf label (ESL) system, including: a server including: a memory; and at least one processor coupled to the memory and configured to perform operations including: obtaining position information associated with a user equipment (UE); retrieving one or more frames of a survey video of a location that correspond to an estimated position of the UE, the estimated position based on the position information; extracting a set of features from the one or more frames; and outputting a description of the estimated position with respect to a descriptional layout of assets associated with the location based on one or more descriptions identified from the descriptional layout, the one or more descriptions identified based on the set of features.

Clause 28: The ESL system of clause 27, where the descriptional layout includes names, descriptions, and locations of products in retail semantics.

Clause 29: The ESL system of clause 28, where the descriptional layout represents a planogram of a store.

Clause 30: The ESL system of clause 28, where the descriptional layout includes descriptions of spatial relationships between at least some of the products.

Components, the functional blocks, and the modules described herein with respect to the figures described above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A device for wireless communication, the device comprising:

at least one processor; and a memory coupled to the at least one processor, the at least one processor configured to cause the device to:

obtain position information associated with a user equipment (UE), the position information including position coordinates associated with the UE, ephemeris data associated with the UE, or both;

retrieve one or more frames of a survey video of a location that correspond to an estimated position of the UE, the estimated position based on the position information, wherein the survey video includes a plurality of frames captured by a video capture device while navigating throughout the location, each of the plurality of frames associated with position coordinates, ephemeris data, or both, at which the respective image frame is captured;

extract a set of features from the one or more frames; and output a description of the estimated position with respect to a descriptional layout of assets associated with the location based on one or more descriptions identified from the descriptional layout, the one or more descriptions identified based on the set of features.

2. The device of claim 1, wherein the description of the estimated position is relative to one or more of the assets.

3. The device of claim 1, wherein the description of the estimated position includes an aisle label, a gondola label, a shelf label, or a combination thereof.

4. The device of claim 1, wherein the at least one processor is configured to further cause the device to:

map the position information to the estimated position of the UE within the location.

5. The device of claim 1, wherein, to obtain the position information, the at least one processor is configured to cause the device to:

calculate one or more of a received signal strength indicator (RSSI), a reference signal received power (RSRP), or an angle of arrival (AoA) of one or more beacon responses from one or more of the assets and a beacon response from the UE; and determine the position information based on one or more of the RSSI, the RSRP, or the AoA of the one or more beacon responses and the beacon response.

6. The device of claim 5, wherein the one or more of the assets correspond to one or more radio frequency identification (RFID) tags for one or more products within an electronic shelf label (ESL) system.

7. The device of claim 1, wherein the device is a network entity.

8. The device of claim 1, wherein the device is an edge or cloud server, and wherein the edge or cloud server is associated with a plurality of electronic shelf label (ESL) access points (APs) or a plurality of ESLs, each ESL of the plurality of ESLs associated with one or more tags corresponding to one or more of the assets.

9. A method of wireless communication, the method comprising:

obtaining position information associated with a user equipment (UE), the position information including position coordinates associated with the UE, ephemeris data associated with the UE, or both;

retrieving one or more frames of a survey video of a location that correspond to an estimated position of the UE, the estimated position based on the position information, wherein the survey video includes a plurality of frames captured by a video capture device while navigating throughout the location, each of the plurality of frames associated with position coordinates, ephemeris data, or both, at which the respective image frame is captured;

extracting a set of features from the one or more frames; and outputting a description of the estimated position with respect to a descriptional layout of assets associated with at the location based on one or more descriptions identified from the descriptional layout, the one or more descriptions identified based on the set of features.

10. The method of claim 9, further comprising:

performing object detection on the one or more frames to detect one or more objects within the one or more frames, wherein at least a portion of the set of features corresponds to the one or more objects.

11. The method of claim 9, wherein the set of features includes products identified in the one or more frames, text of signs in the one or more frames, directional features with respect to one or more detected objects in the one or more frames, geometric descriptions of the one or more frames, spatial descriptions of the one or more frames, text descriptions of the one or more frames, or a combination thereof.

12. The method of claim 9, further comprising:

providing one or more prompts based on at least one of the set of features to an artificial intelligence (AI) large language model (LLM) to generate one or more other features of the set of features.

13. The method of claim 9, further comprising:

performing pattern matching between the set of features and the descriptional layout to identify the one or more descriptions that most closely match the set of features.

14. The method of claim 9, further comprising:

providing one or more prompts based on at least one of the one or more descriptions to an artificial intelligence (AI) large language model (LLM) to generate the description of the estimated position.

15. The method of claim 9, wherein the set of features further includes sign-based features, the sign-based features including text of one or more signs in the one or more frames, descriptions of the one or more signs, or a combination thereof.

16. The method of claim 15, further comprising:

providing one or more prompts based on at least one of the sign-based features to an artificial intelligence (AI) large language model (LLM) to generate at least one of the descriptions of the one or more signs.

17. The method of claim 15, further comprising:

prior to identifying the one or more descriptions, filtering at least one description from the descriptional layout based on the sign-based features.

18. The method of claim 15, wherein the description of the estimated position is with reference to signs within the location.

19. The method of claim 9, further comprising:

transmitting the description of the estimated position to the UE.

20. A non-transitory, computer-readable medium storing instructions that, when executed by one or more processors, cause the one or more processors to perform operations comprising:

obtaining position information associated with a user equipment (UE), the position information including position coordinates associated with the UE, ephemeris data associated with the UE, or both;

retrieving one or more frames of a survey video of a location that correspond to an estimated position of the UE, the estimated position based on the position information, wherein the survey video includes a plurality of frames captured by a video capture device while navigating throughout the location, each of the plurality of frames associated with position coordinates, ephemeris data, or both, at which the respective image frame is captured;

extracting a set of features from the one or more frames; and outputting a description of the estimated position with respect to a descriptional layout of assets associated with at the location based on one or more descriptions identified from the descriptional layout, the one or more descriptions identified based on the set of features.

21. The non-transitory, computer-readable medium of claim 20, wherein the operations further comprise:

storing the description of the estimated position and the estimated position in a position information database, wherein the position information database is configured to store descriptions of positions and associated position data.

22. The non-transitory, computer-readable medium of claim 21, wherein the operations further comprise:

receiving a reverse lookup request that includes a description of a requested position;

accessing the position information database to identify position data associated with the description of the requested position; and outputting the identified position data.

23. The non-transitory, computer-readable medium of claim 20, wherein the operations further comprise:

obtaining an image of a current position of the UE;

performing object detection on the image to detect a sign within the image;

extracting a second set of features from a portion of the image that includes the sign; and outputting a description of the current position with respect to a plurality of signs described in the descriptional layout, the description of the current position based on descriptions of one or more of the plurality of signs identified from the descriptional layout based on the second set of features.

24. The non-transitory, computer-readable medium of claim 20, wherein the operations further comprise:

receiving a query from the UE, the query including a requested item;

determining directions from the estimated position to a position of the requested item;

determining a description of the directions based on the descriptional layout; and outputting the description of the directions to the UE.

25. An electronic shelf label (ESL) system, comprising:

a server comprising:

a memory; and at least one processor coupled to the memory and configured to perform operations comprising:

obtaining position information associated with a user equipment (UE), the position information including position coordinates associated with the UE, ephemeris data associated with the UE, or both;

retrieving one or more frames of a survey video of a location that correspond to an estimated position of the UE, the estimated position based on the position information, wherein the survey video includes a plurality of frames captured by a video capture device while navigating throughout the location, each of the plurality of frames associated with position coordinates, ephemeris data, or both, at which the respective image frame is captured;

extracting a set of features from the one or more frames; and outputting a description of the estimated position with respect to a descriptional layout of assets associated with the location based on one or more descriptions identified from the descriptional layout, the one or more descriptions identified based on the set of features.

26. The ESL system of claim 25, wherein the descriptional layout includes names, descriptions, and locations of products in retail semantics.

27. The ESL system of claim 26, wherein the descriptional layout represents a planogram of a store.

28. The ESL system of claim 26, wherein the descriptional layout includes descriptions of spatial relationships between at least some of the products.

* * * * *